(12) United States Patent
Marquardt

(10) Patent No.: US 6,647,830 B2
(45) Date of Patent: Nov. 18, 2003

(54) ADVANCED TOOL SYSTEMS

(76) Inventor: Steven H. Marquardt, 4144 Hwy. 17 North, Rhinelander, WI (US) 54501

( * ) Notice: Subject to any disclaimer, the term of this patent is extended or adjusted under 35 U.S.C. 154(b) by 0 days.

(21) Appl. No.: 10/034,902

(22) Filed: Dec. 27, 2001

(65) Prior Publication Data

US 2003/0061913 A1 Apr. 3, 2003

Related U.S. Application Data

(60) Provisional application No. 60/259,065, filed on Dec. 29, 2000.

(51) Int. Cl.[7] .............................................. B25B 17/00
(52) U.S. Cl. ....................................... 81/57.3; 81/57.43
(58) Field of Search .......................... 81/57.3, 57.14, 81/57.43, 63.2; 403/277, 280, 279, 297; 220/3.5, 253, 200

(56) References Cited

U.S. PATENT DOCUMENTS

| | | | |
|---|---|---|---|
| 793,729 A | 7/1905 | Mahlen | |
| 1,356,555 A | 10/1920 | Oringderff | |
| 1,378,719 A | 5/1921 | Poole | |
| 1,578,331 A | 3/1926 | Litwiller | |
| 2,288,217 A | 6/1942 | Trautman | |
| 2,436,650 A | 2/1948 | Killmer | |
| 2,530,553 A | 11/1950 | Strobell | |
| 2,572,297 A | 10/1951 | Able et al. | |
| 2,672,065 A | 3/1954 | Danuskie | |
| 2,678,577 A | 5/1954 | Tackett | |
| 2,817,256 A | 12/1957 | Malone et al. | |
| 2,830,479 A | 4/1958 | Finn | |
| 3,138,983 A | 6/1964 | Frizzell | |
| 3,283,621 A | 11/1966 | Faso | |
| 3,392,608 A | 7/1968 | Schanen et al. | |
| 3,714,852 A | 2/1973 | Giangrasso | |
| 3,939,924 A | 2/1976 | Grabovac | |
| 3,987,691 A | 10/1976 | Savage | |
| 4,184,390 A | 1/1980 | Evans | |
| 4,224,844 A | 9/1980 | Henriksen | |
| 4,231,271 A | 11/1980 | Yamada | |
| 4,287,795 A | 9/1981 | Curtiss | |
| 4,291,597 A | * 9/1981 | Allen | 81/3.48 |
| 4,355,465 A | * 10/1982 | Besson | 30/344 |
| 4,419,032 A | 12/1983 | Flowers | |
| 4,506,567 A | 3/1985 | Makhlouf | |
| 4,656,894 A | 4/1987 | Goetz | |
| 4,838,130 A | 6/1989 | Snyder | |
| 4,867,016 A | 9/1989 | Di Edwardo | |
| 4,928,558 A | 5/1990 | Makhlouf | |
| 5,072,633 A | 12/1991 | Smith | |
| 5,129,823 A | 7/1992 | Hughes | |
| 5,205,458 A | 4/1993 | Kunreuther | |

(List continued on next page.)

FOREIGN PATENT DOCUMENTS

| | | |
|---|---|---|
| DE | 2713940 A | 11/1977 |
| DE | 2713807 A | 10/1978 |
| GB | 2056348 A | 3/1981 |
| GB | 2108029 A | 5/1983 |
| GB | 2108029 B | 6/1985 |
| GB | 2160137 A | 12/1985 |
| GB | 2239415 A | 7/1991 |
| WO | 9738826 A | 10/1997 |
| WO | 9958074 A | 11/1999 |

*Primary Examiner*—D. S. Meislin
(74) *Attorney, Agent, or Firm*—Andrus, Sceales, Starke & Sawall, LLP

(57) ABSTRACT

A tool has a pair of elongate housings adapted to be joined together in a housing assembly for enclosing and supporting a flexible drive mechanism entrained about a pair of rotatable elements. Each of the rotatable elements is disposed on the housing assembly at opposite ends thereof. A flexible drive mechanism provides a transfer of power between the rotatable elements so that rotation of one rotatable element at one input end of the housing assembly will effect driven rotation of the other rotatable element at an output end of the housing assembly. The elongate housings include male and female configurations for aligning and joining the housings without independent fasteners.

24 Claims, 26 Drawing Sheets

U.S. PATENT DOCUMENTS

| | | | |
|---|---|---|---|
| 5,257,558 A | * 11/1993 | Farzin-Nia et al. | ............ 81/418 |
| 5,458,603 A | 10/1995 | Futch, Sr. | |
| 5,461,949 A | 10/1995 | Carver | |
| 5,540,122 A | 7/1996 | Lund | |
| 5,586,474 A | 12/1996 | Lund | |
| 5,629,823 A | * 5/1997 | Mizuta | ....................... 403/277 |
| 5,775,182 A | 7/1998 | Plakinger | |
| 5,860,335 A | 1/1999 | Lund | |
| 5,974,913 A | 11/1999 | Von Rotz et al. | |
| 6,120,118 A | * 9/2000 | Dean | ........................ 312/223.2 |
| 6,135,465 A | * 10/2000 | Chapman | ................... 280/47.1 |
| 6,189,419 B1 | 2/2001 | Pijanowski | |
| 6,193,624 B1 | 2/2001 | Lund | |
| 6,216,565 B1 | 4/2001 | McCann | |

* cited by examiner

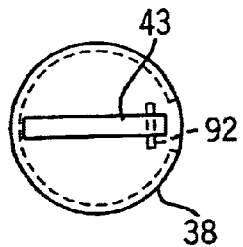 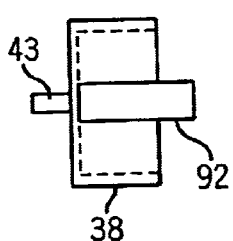 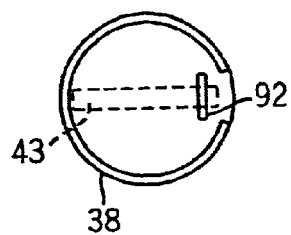
FIG. 9A   FIG. 9B   FIG. 9C
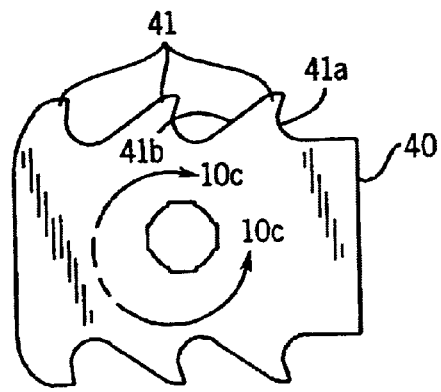 
FIG. 10A   FIG. 10B
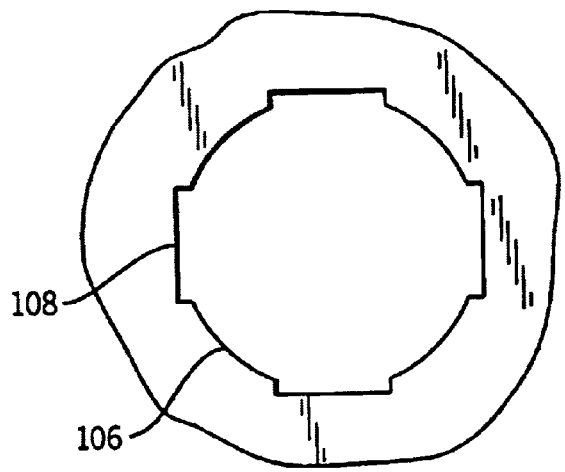
FIG. 10C

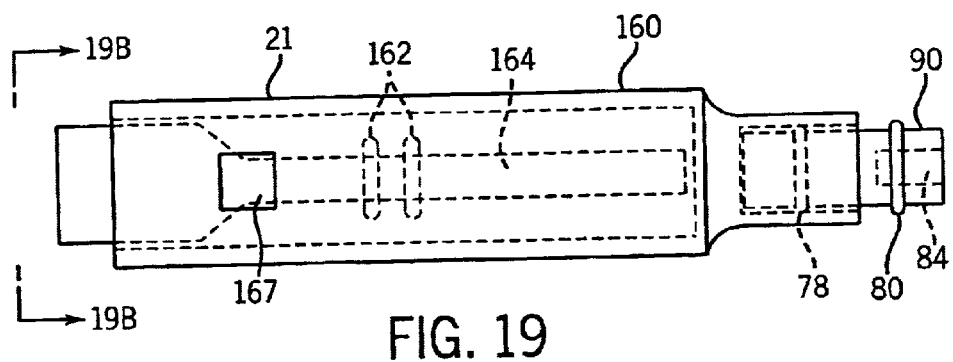
FIG. 19
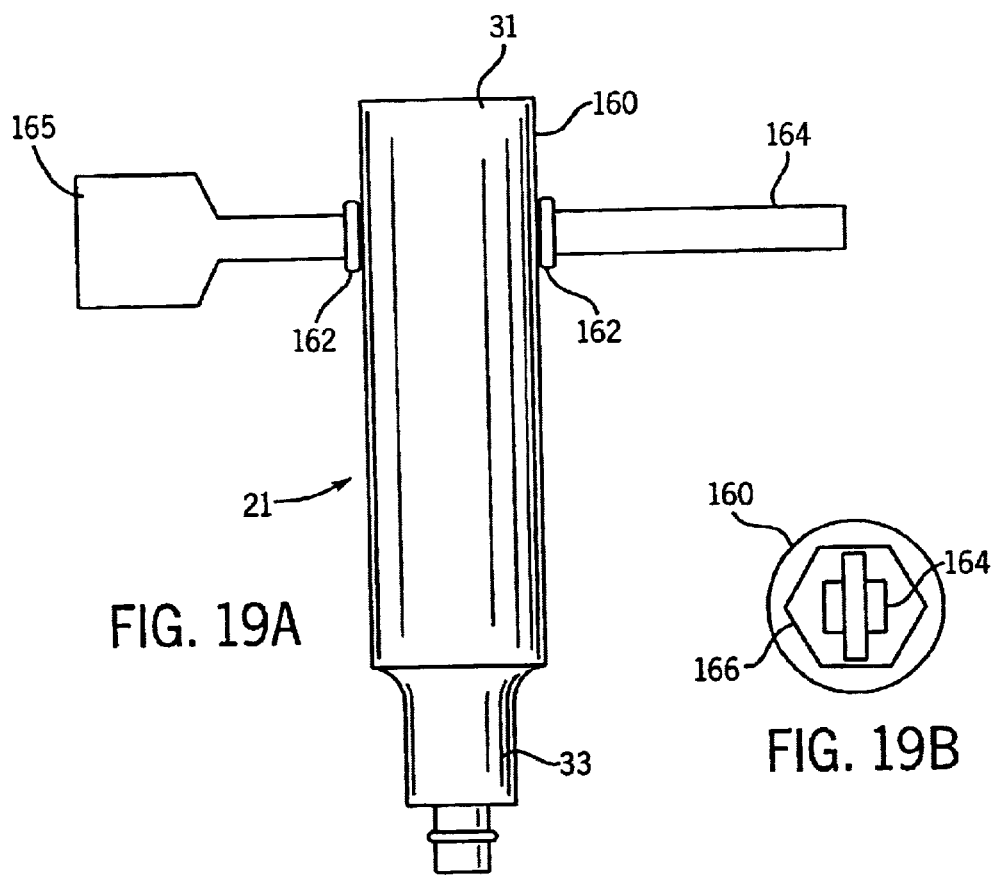
FIG. 19A
FIG. 19B

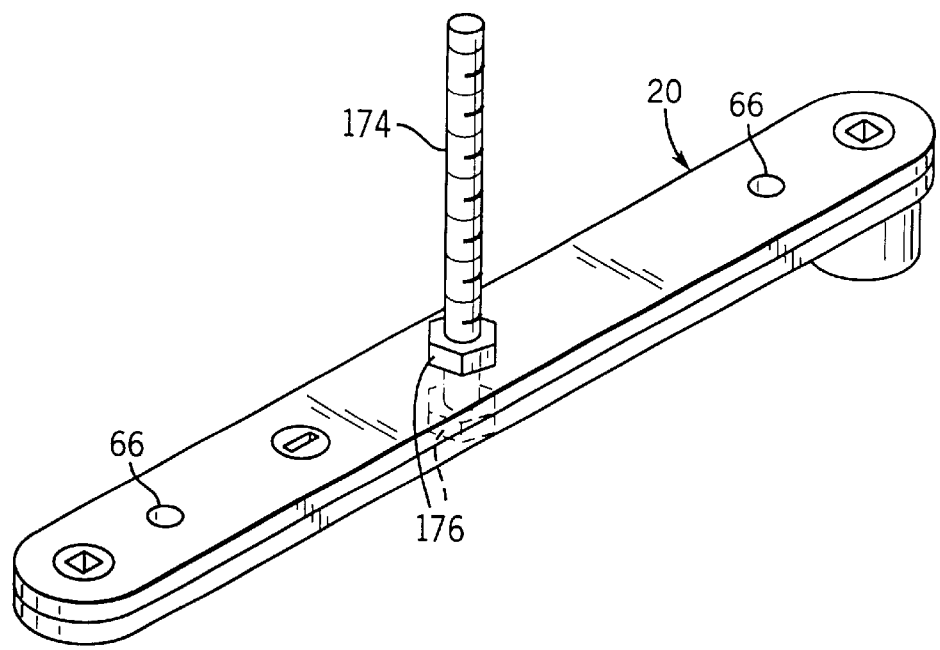
FIG. 25
FIG. 26
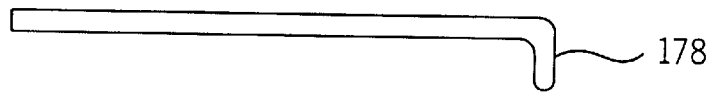
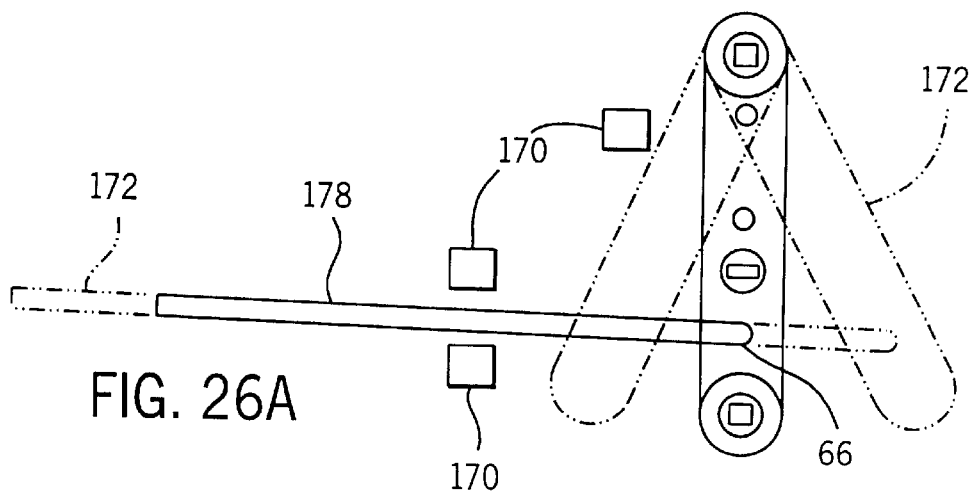
FIG. 26A

ADVANCED TOOL SYSTEMS

CROSS-REFERENCE TO RELATED APPLICATIONS

This application is based on Provisional U.S. Patent Application Ser. No. 60/259,065 filed Dec. 29, 2000, originally titled "Chain Drive Tools".

FIELD OF THE INVENTION

This invention relates generally to tools with a rotational power output providing distance extending, angle changing, torque increasing and rotational power transferring capabilities. More particularly, the invention relates to chain drive tools and a system which provides an improved, simplified rotational power transferring capability with a directional control or ratcheting option and a modular option that allows assembling the tools in a wide variety of angular and extended configurations to enable accomplishing tasks such as tightening and loosening threaded fasteners and the like located in remote, difficult to reach or limited access locations. The present invention has further utility in the field of machine tooling, by providing the capability of changing the location and direction of rotational power from its original source to allow machining and other functions in locations and orientations not reachable using conventional tooling and fixturing.

BACKGROUND OF THE INVENTION

The problem of providing access in confined spaces for efficient machining and assembly purposes has long existed. Often engineers must re-design all or part of a project due to lack of access for manufacturing or installation. Most hand wrenches or ratchets must be swung in an arc, which motion may be limited or impossible due to obstructions around the item or items being assembled, installed or removed. In the machining art, many parts often must be set up and machined more than one time so that the machine tool or tools have access to the area being machined.

Pneumatic and electric power tools include an attached hose, cord or battery all of which can be heavy and inconvenient. These tools also usually require straight-in access into cavities and other recessed and remote locations. These requirements make the tools inconvenient, expensive and sometimes impossible to use for certain applications. The known tools typically do not function so as to transfer power or torque around corners or form compound angles without some type of additional adaptor or knuckle-type component which can be cumbersome and bind when loaded. The known adaptor and knuckle-type components are also typically limited to producing a maximum 30 degree angle to the original drive source because of the binding problem of their components.

Known prior art flexible drives have lacked any significant commercial success due to many reasons including high manufacturing costs, complexity and inability to extend or transfer rotational power around corners well enough to justify the expense of the drives to customers.

The known prior art flexible drive devices suffer variously from the following disadvantages as presented below.

Disadvantages Index

A. Can be used as a power transfer device only, cannot function independently.
B. Lack the ability to function adjustably around corners.
C. Contain additional parts to maintain chain tightness.
D. Contain no provision for machine applications.
E. Are complex and expensive to manufacture.
F. Need an exterior ratchet mechanism to operate.
G. Do not provide an economical means of adjustable compound angle operation.
H. Housings do not provide a self-locking mechanism for assembly.
I. Do not provide a mechanical advantage.
J. Do not provide an economical means for adding a power source.
K. Must be mounted onto another tool for operation.
L. Flexible drive mechanism is exposed during operation—will accumulate dirt and become entangled with other objects.
M. Exposed drive mechanism may pinch or otherwise injure operator during use.
N. Do not contain internal square drives for multiple function use.
O. Do not contain a ratchet-enabling switch.
P. Ratchet switch is not located on operator end.
Q. Ratchet switch does not provide a neutral position for use.
R. Do not specify die casting or injection molding for precise and economical manufacture of parts.
S. Lack any significant commercial success.
T. Multiple tools cannot be securely connected at adjustable angles and compound angles for operation.
U. Cannot be used as a torque transfer device.
V. Do not specify safety enhancing materials for manufacture.
W. Cannot provide rotary motion through the adjustable angle connection point between tools.

As explained below the novel Advanced Tool Systems of the present invention overcomes the disadvantages of the prior art set forth above.

SUMMARY OF THE INVENTION

This invention is an economical, yet versatile tool and system which provides increased access and efficiency for manufacturing, machining and assembly operations while also providing increased safety and ergonomics.

The system is comprised of three parts:

A. Basic tool designs and configurations. (Hereafter referred to as "Chain Drive Tools" or CDT.)
B. Secondary tools for separate use or for enhancing basic system.
C. Accessories, tool holding and tool-retaining systems to compliment the complete system.

Summary—Basic Tools Designs

This invention is comprised of a two-part housing which encloses an endless chain and two sprockets for providing rotational power output and one or more of the following novel features:

A. An exterior tool interlock system for joining two (or more) tools and for angle adjustment.
B. An internal two or three-position selector switch for ratcheting and power-driven modes of operation.
C. The housing may be configured straight, permanently angled, tapered, at compound angles or any combination thereof.

D. The housings can be easily designed to contain their own power source (battery, pneumatic, ac/dc electric, hydraulic, mechanical advantage etc.) and still maintain the other modes of operation.

E. The housing may also provide holes for attachment to machine tools, for independent action or placement and holding of the tool in a confined space.

F. The housing may provide its own assembly features.

G. Compound and right angle tools containing an additional drive gear and reconfigured housings.

Summary—Secondary Tools

The present invention includes a triple tool comprised of an outer housing, two drive gears and two end plates and one or more of the following novel features:

A. An outer housing of one-piece cast or injection molded construction.

B. End plates press-fit into the outer housing of the tool requiring no additional parts and containing an anti-rotation feature.

C. End plates that may incorporate a lug interlock system for combination with other Chain Drive Tools at adjustable angles.

D. Drive gears incorporating an external, or internal, square drive and containing an internal hex or an internal thread for securing tools thereto and using the lug interlock system.

The present invention also includes a combination tool. This invention is comprised of a formed tube and a cross-member and one or more of the following novel features:

A. The tube is one-piece and forms an internal spark plug or similar hex or other drive socket or member on one end and an external square drive or internal square drive holder on the other end.

B. The tube also contains a cross hole for use of cross-member to apply extra force as a T-handle or to be tapped by a hammer.

C. The tube handle is externally sized for hand operation as a square or screw driver as well as internally sized to grip cross-member for storage.

D. The square drive adaptor also contains an internal hex for screwdriver tip use.

E. The cross member can also be used as a square driver for sockets.

The drive adaptor may be eliminated by incorporating it as part of formed tube, however this will limit it's versatility to function with other drive adaptors for other uses.

The invention can also include a hand-wheel, which is a multiple use tool incorporating an external square drive or internal square drive or other useful configuration and an internal hex feature for direct operation by hand or power tools or separate use as a screwdriver with standard hex bits.

Summary—Accessories and Toolholders

A. Sprocket drive members and/or adaptors may include a snap-spring, which is a one-piece, tool-retaining member that also functions with conventional sockets and tools.

B. Quick-change drill chucks and collets that also provide clearance for tools to extend out the back of tool holders to permit length adjustment and better access in confined spaces.

C. Shorty sockets and male hexes that incorporate a male square drive into a drive body as well as a short body length for increased access.

D. A square bolt for connecting sprockets, and therefore tools, in conjunction with the lug interlock system.

E. Various square drive adaptors to accommodate larger and smaller square drive tools as well as both male and female hex adaptors for screwdriver and electric drill use.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 9A is a top view of a switch button;

FIG. 9B is a side view of a switch button;

FIG. 9C is a bottom view of the switch button;

FIG. 10A is a top view of a switch plate;

FIG. 10B is a side view of the switch plate;

FIG. 10C is an enlarged detail view taken from FIG. 10A;

FIG. 19 is a stored view of a combination tool;

FIG. 19A is an assembled view of the combination tool;

FIG. 19B is a end view taken on line 19B—19B of FIG. 19;

FIG. 25 is a perspective view of a master tool formed with an attachment hole;

FIG. 26 is an elevational view of an L-shaped rod;

FIG. 26A is a top view of a master tool using the L-shaped rod in a push-pull fashion;

DETAILED DESCRIPTION OF THE INVENTION

Figure 1:
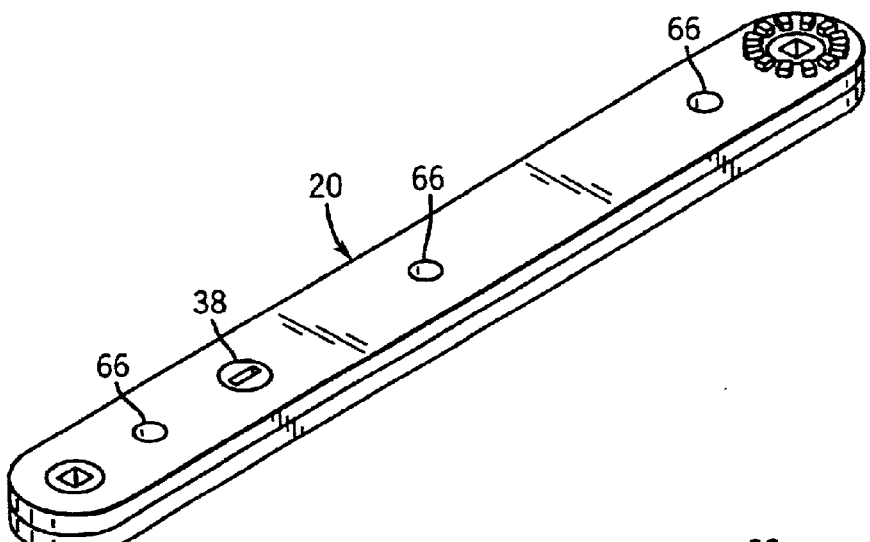
FIG. 1 is a perspective view of a straight, chain drive master tool.
Figure 1A:
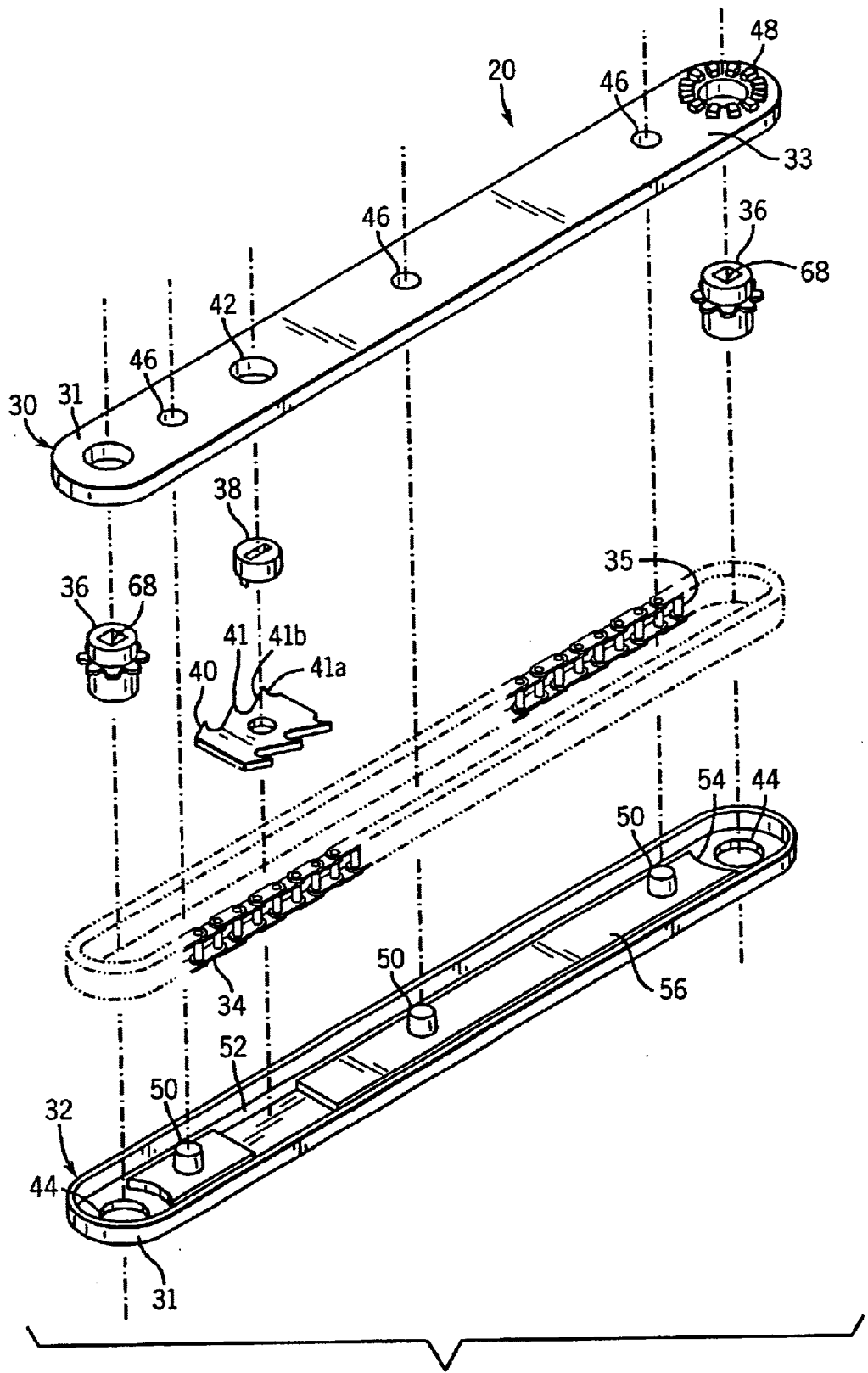
FIG. 1A is an exploded view of the straight master tool shown in FIG. 1.

A preferred embodiment of a chain drive tool 20 of the present invention is shown in FIGS. 1 and 1A. The tool 20 provides an outer housing comprised of a top 30 and a bottom 32 housing to enclose or contain the preferred flexible drive mechanism that includes an endless element which preferably is a roller chain 34 encircling two rotatable elements in the form of sprockets 36. Sprockets 36 are rotatably drivable one by the other via chain 34 and can receive and transmit rotational forces via preferred internal square drive receptacles or other configurations located axially therein or any other desired connectors (not shown).

The housing top and bottom 30, 32 and other components are preferably cast such as by die casting, or molded from precision dies to control working distance between sprocket bearing holes 44 for mounting the sprockets 36 for rotation in the housing at an input end 31 and an output end 33. Close tolerance chain tracks 56 or other suitable channels provide guidance for the roller chain. The sprocket bearing holes 44, chain tracks 56 and a sprocket clearance area 54 are typical features that can be cast, molded or otherwise formed in both the top 30 and bottom 32 of the housing.

Roller chain 34 is preferably pre-stretched to control working length and simulate future wear, thereby eliminating the chain tensioning apparatus required in prior art constructions.

Other types of flexible drive mechanisms may also be utilized such as, but not limited to, silent chains, composite or other flexible positive (toothed or internal spaced) or friction drives.

As shown in FIGS. 1A, 3A, 12, and 13, the housing also includes an external lug interlock system 48 including cooperably engageable elements that enable the housing to be fixedly or non-rotatably connected together with another of the tools, an extender, or another object at one or more different angles, while still allowing the rotational operation of internal chain 34 and sprockets 36 for transmitting rotational forces between the tool 20 and another tool or object.

The tool 20, as shown in FIG. 1A, also preferably includes a ratcheting element including a switch plate 40 and a selector element or switch button 38 selectably movable between at least two ratcheting positions (forward and reverse) to allow ratcheting operation like a standard ratchet wrench.

Referring also to FIGS. 9A through 11D, the switch button 38 has a resiliently biasable or flexible eccentric tab 92 that extends into a central hole 106 of the switch plate 40. Flexible eccentric tab 92 may be rectangular in shape and clearance is provided inside switch button 38 so that the tab 92 may flex toward the center of the button as needed. A central hole 106 of the switch plate 40 has small notches 108 to receive and hold flex tab 92 in the forward, reverse and a neutral position as desired.

Central hole 106 may also be oval or otherwise shaped to retain and function with flexible tab 92 of switch button 38.

Figure 11A:
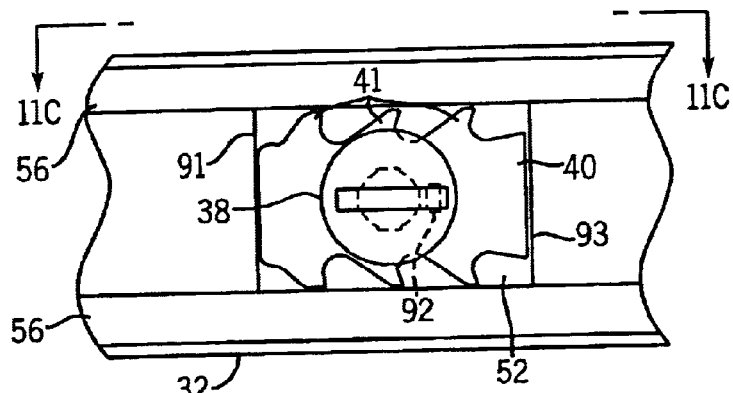
FIG. 11A is a fragmentary view showing a selector switch in a neutral position.
Figure 11B:
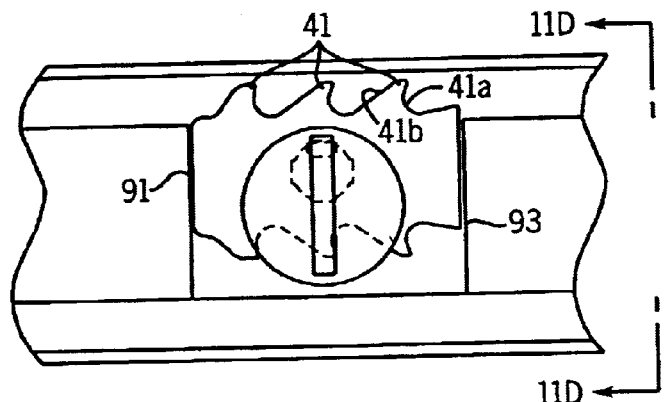
FIG. 11B is a fragmentary top view showing the selector switch in a forward position.
Figure 11C:
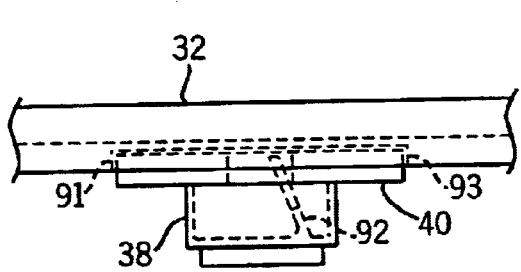
FIG. 11C is a sectional view taken on line 11C—11C of FIG. 11A.
Figure 11D:
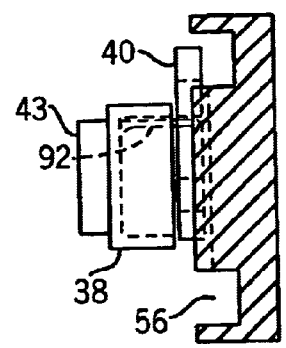
FIG. 11D is a sectional view taken on line 11D—11D of FIG. 11B.

In FIGS. 11A, 11B, 11C and 11D, the top housing 30 has been removed for viewing clarity and switch button 38 superimposed. The chain tracks 56 are also shown empty of roller chain 34 for clarity. As shown in FIG. 11B, when positioned in the first or forward position in a switch plate clearance cavity or area 52 for receiving the switch plate 40, the switch button 38 and the switch plate 40 cooperate to allow movement of the chain 34 and the sprockets 36 in a first rotational or forward direction (toward the right side of the drawing) while preventing movement in the opposite or reverse direction. The selector switch mechanism (comprised of switch button 38 and switch plate 40) is shown in the neutral position in FIG. 11A not engaged with the chain 34 to allow the tool 20 to be freely driven in either direction, for instance, using other hand or power tools. The switch plate 40 is movable to a reverse position (not shown) below the neutral position and is operable in cooperation with the switch button 38 to allow movement of the chain 34 and the sprockets 36 in the second rotational or reverse direction (toward the left side of the drawing) while preventing movement in the opposite or forward direction.

Referring also to FIG. 1A, switch button 38 is retained for rotation in a switch button hole 42 located near an operator end 31 of top housing 30 which is that end of the tool 20 intended to be grasped and held by a user, the selector switch mechanism 38,40 being located at this position for convenience. A raised bar 43 on the switch button 38 extends through hole 42 in top housing 30 allowing finger operation.

Switch button 38 may also be designed to extend through both housings 30, 32 for operation on either side of tool 20. (not shown)

Advantages of the construction shown include the simplicity and low cost thereof. The switch plate 40 can be formed from a suitable material, such as but not limited to, a steel, and can be suitably hardened, such as by heating and quenching, or, for some applications, can be die cast, molded, stamped or otherwise inexpensively manufactured, and includes teeth 41 receivable in the spaces between the rollers 35 of a conventional roller drive chain 34. The teeth 41 each have a front side 41a having an abrupt or concave shape which holds or retains the rollers 35 when urged thereagainst thereby preventing movement of the chain 34 in that direction. Each tooth 41 has an opposite back side 41b having a ramp or tapered shape which allows a force exerted thereagainst by the rollers 35 to be transferred to the flexible tab 92 of the switch button 38 to cause it to resiliently yield and allow the switch plate 40 to move toward the center of the housing sufficiently to allow the rollers 35 to roll over the teeth 41 and advance in the direction of the applied force.

The switch plate cavity 52 is sized and shaped to allow smooth movement of the switch plate 40 by the selector button 38 between the first position and the second position through the neutral position, and when the switch plate 40 is in either of the first and second positions, the force loading against the front sides 41a of the teeth 41 of the switch plate 40 from the chain 34 is transferred to the housing at the ends of the switch plate cavity 52 as illustrated at locations 91 and 93 of switch plate cavity 52 in FIG. 11B, and not against the flexible tab 92 of the switch button 38. Tab pressure can also retain switch mechanism at neutral as desired.

Figure 2:
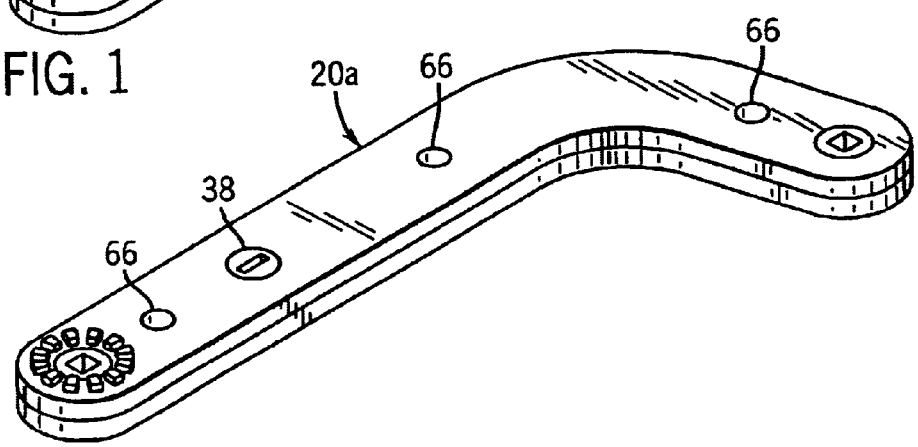
FIG. 2 is a perspective view of a permanently angled master tool.
Figure 2A:
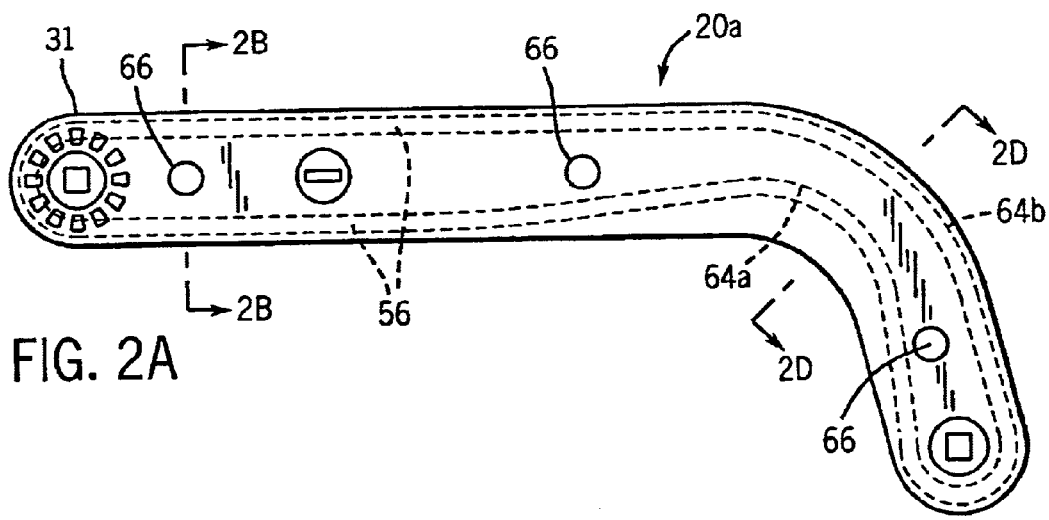
FIG. 2A is a top view of the permanently angled master tool.
Figure 2B:
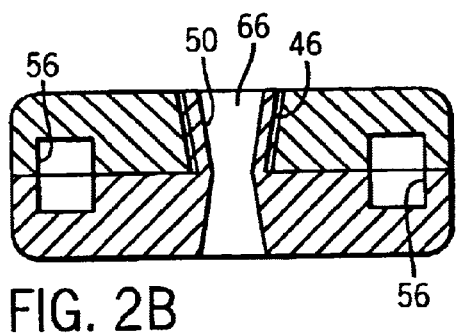
FIG. 2B is a sectional view of a housing attachment system taken on line 2B—2B of FIG. 2A showing male boss permanently flared into female hole.

The housings 30, 32 also provide preferred alignment and attachment features, as shown in FIGS. 1A, 2A, 2B, 2C for holding the top and bottom halves together. These features include male bosses 50 having upper and lower open ends as part of lower housing 32 and mating female tapered holes 46 in top housing 30. The top and bottom housings 30, 32 (with internal parts installed) are matingly assembled (FIG. 2C) and the open ended male bosses 50 internally swaged (flared) outward into the tapered female holes 46 of top housing, 30, as shown in FIG. 2B.

This design provides a rugged, simple, self-aligning assembly method while at the same time providing multiple-use attachment holes 66 through housings 30, 32.

Figure 8:
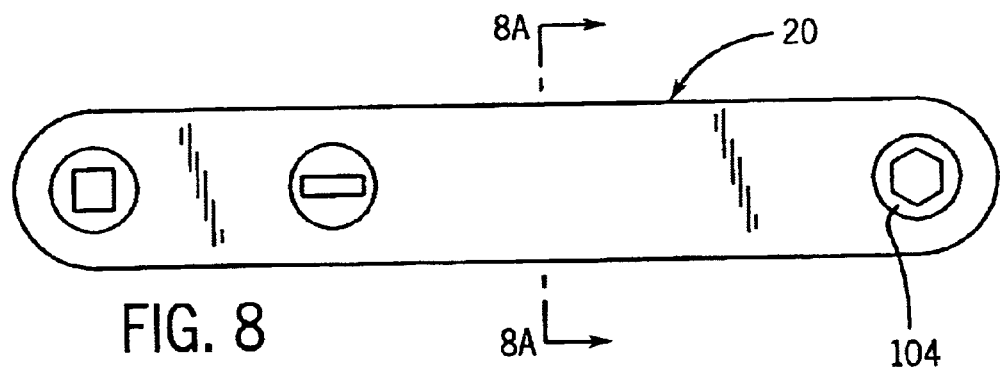
FIG. 8 is a top view of the master tool with an injection molded design.
Figure 8A:
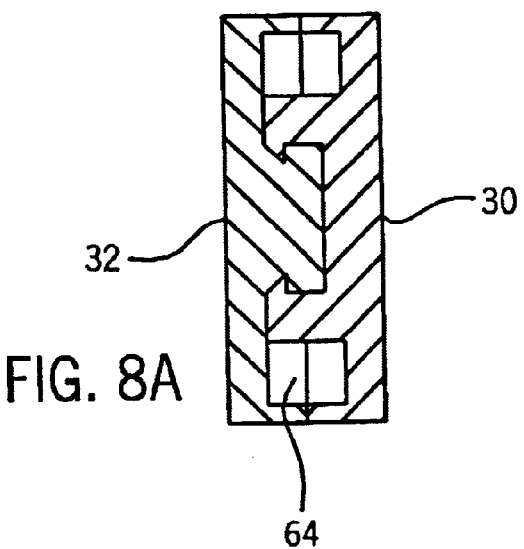
FIG. 8A is a sectional view taken on line 8A—8A of FIG. 8 showing an assembled tool.
Figure 8B:
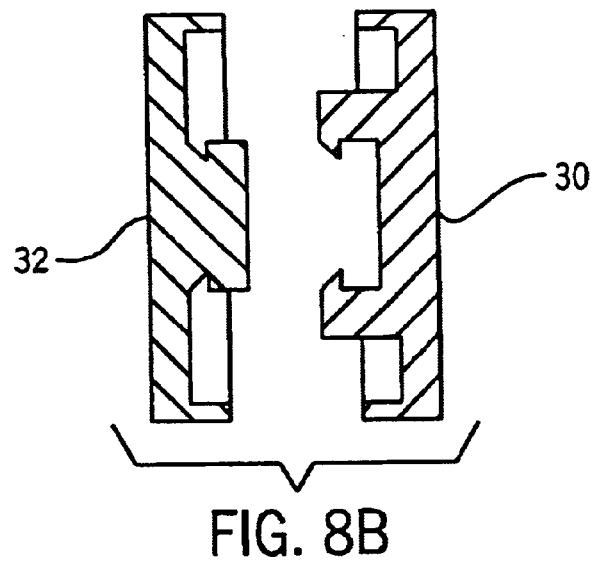
FIG. 8B is an exploded view of the section in FIG. 8A prior to assembly.

Injection molded embodiments may also be designed with snap-together features as shown in FIGS. 8, 8A and 8B.

Figure 2C:
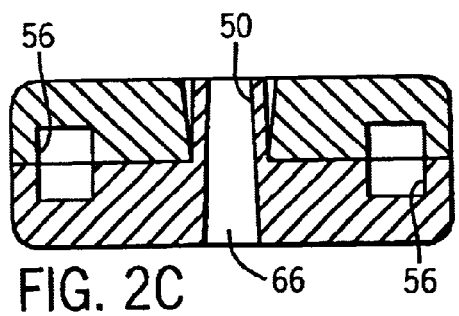
FIG. 2C is a sectional view of the housing attachment system taken on line 2B—2B of FIG. 2A prior to flaring (swaging) of male boss.
Figure 2D:
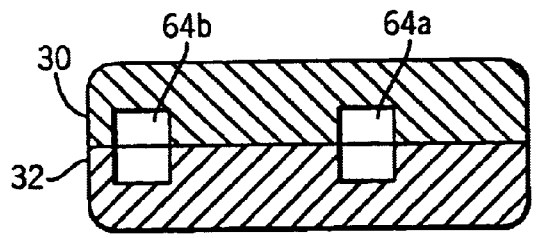
FIG. 2D is a sectional view taken on line 2D—2D of FIG. 2A.

The present tool can alternatively have a curved or bent shape such as, but not limited to, the generally L shape shown in FIGS. 2 and 2A, and can contain chain track areas or sections 64a, 64b that are cast in an arc through the bend regions of the housing. The section 64a extends convergingly toward the middle or centerline of the tool to support the drive chain (not shown) at this critical stress point, as shown in FIG. 2D.

Figure 4:
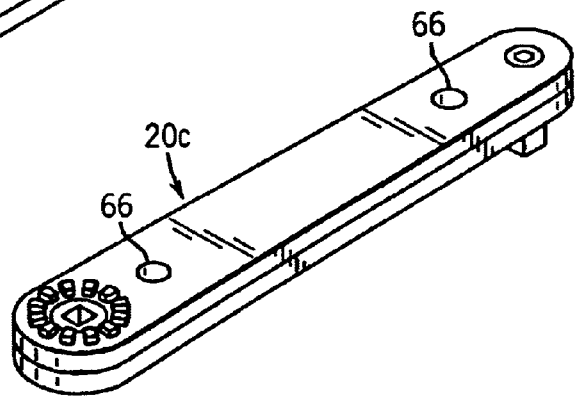
FIG. 4 is a perspective view of a tapered slave tool.
Figure 4A:
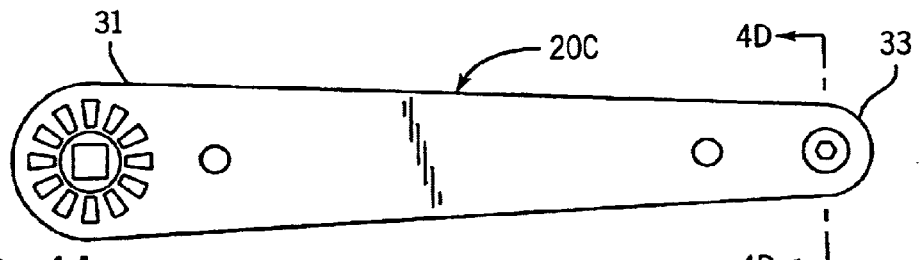
FIG. 4A is a top view of the tapered slave tool.

As another alternative embodiment, the housing of the present tool 20 can have a tapered shape, as shown in FIGS. 4 and 4A, which is a low-profile taper towards the output or working end, 33 illustrated here with a solid drive sprocket 86 having a male square drive 88 and an internal hex 84 on opposite sides thereof, for increased access and function.

Description—Lug Interlock

Figure 3:
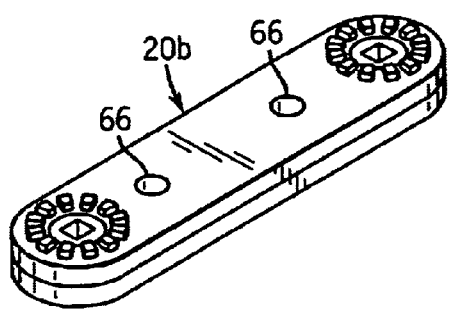
FIG. 3 is a perspective view of a straight slave tool.
Figure 3A:
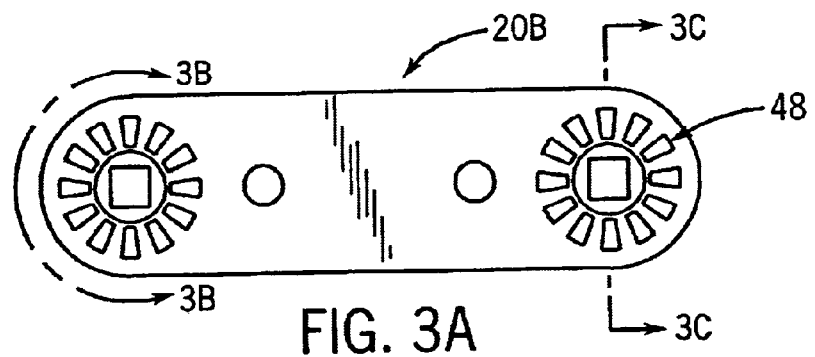
FIG. 3A is a top view of the straight slave tool.

An external lug interlock system is provided as part of top or bottom (or both) housing as shown in FIG. 3A. The lug interlock 48 is designed so that each raised lug 70 is slightly smaller than a corresponding gap 72 between the lugs.

Figure 12A:
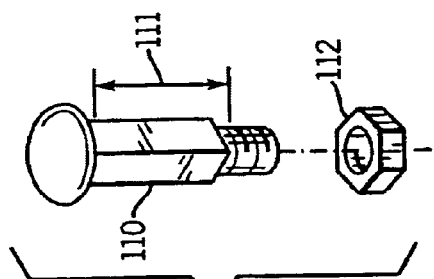
FIG. 12A is a perspective view of a square bolt and nut forming the attachment system.
Figure 12:
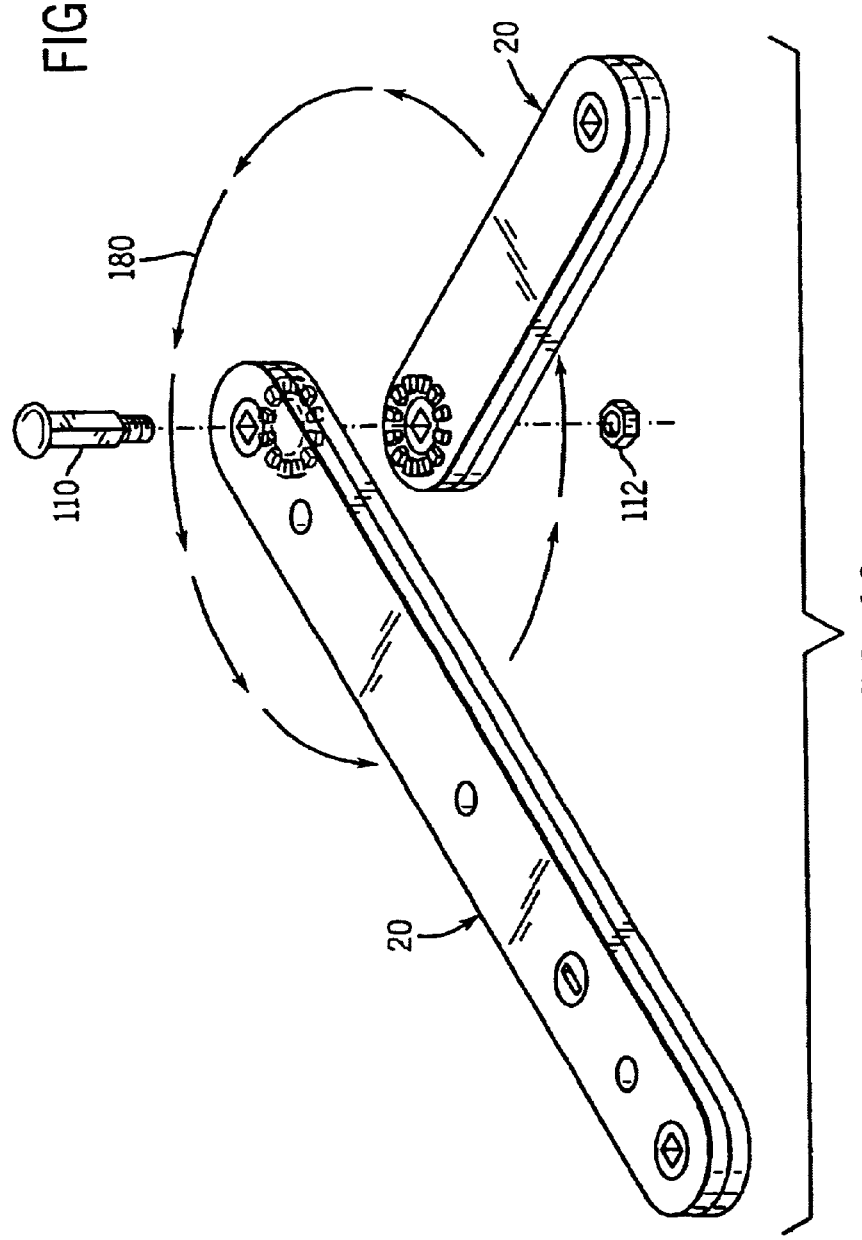
FIG. 12 is an exploded view of a lug interlock system.

This enables lug patterns from different tools to be fit together and locked at a desired angle by a square bolt 110 and a nut 112 as shown in FIGS. 12 and 12A.

Note that faces of sprockets 74 are raised above adjacent housing surfaces 76 on both sides of the tool. FIG. 3C.

This allows square bolt 110 and nut 112 FIGS. 12 and 12A to hold sprocket faces tightly together without binding internal drive. This novel design allows free movement of internal drive assemblies while outer housings of different tools are effectively locked together.

Tools may be interlocked every 30 degrees (with 12 lug pattern shown) for a full 360 degree rotation as shown in FIG. 12A.

Combined tools may be repositioned slightly (skewed) to accommodate angles required in-between standard interlock positions.

Figure 3B:
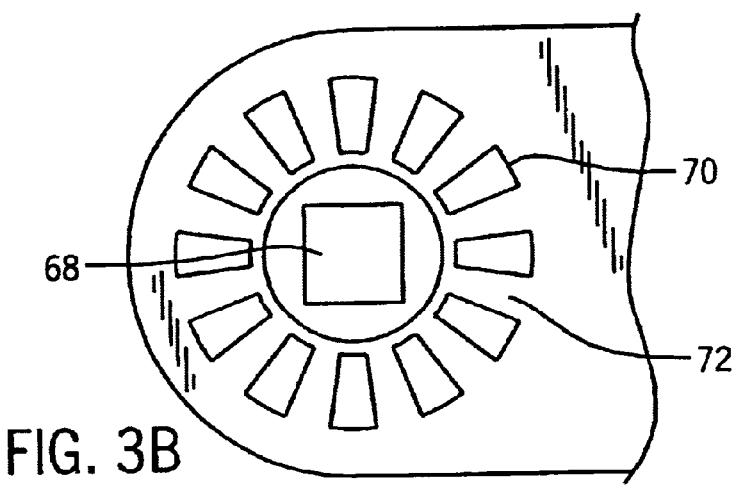
FIG. 3B is an enlarged detail view of a lug interlock structure shown in FIG. 3A.
Figure 3C:
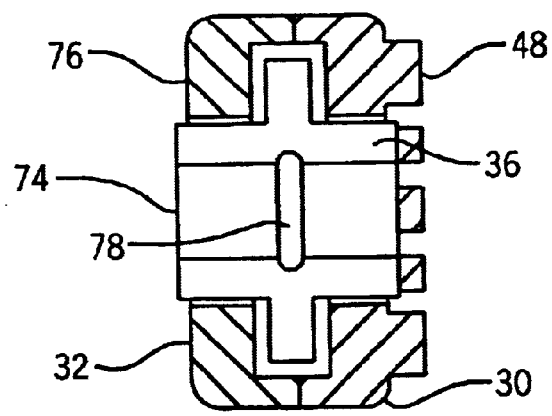
FIG. 3C is a sectional view taken on line 3C—3C of FIG. 3A.

The number (and size) of lugs 70, FIG. 3B, may be increased or decreased as desired to provide more or less adjustability.

Note that square bolt body length 111, FIG. 12A, is slightly shorter than the overall length of the two combined sprockets to allow tightening action of nut 112.

Interlocking designs other than the trapezoidal shaped type shown may be used for combining tools at adjustable angles, however, the preferred invention offers the greatest strength while still providing the ability to combine any two tools together as it contains both the male and mating female configuration in the same design.

Description—Attachment Systems

The following attachment systems provide a means of attaching two or more tools together through their rotating members by providing a torque-transmitting shape for connection and a secondary retaining screw or nut for securing in the lengthwise direction.

The system may be as shown in FIG. 12A as a square bolt 110 and nut 112 (for tools with through holes).

Figure 14:
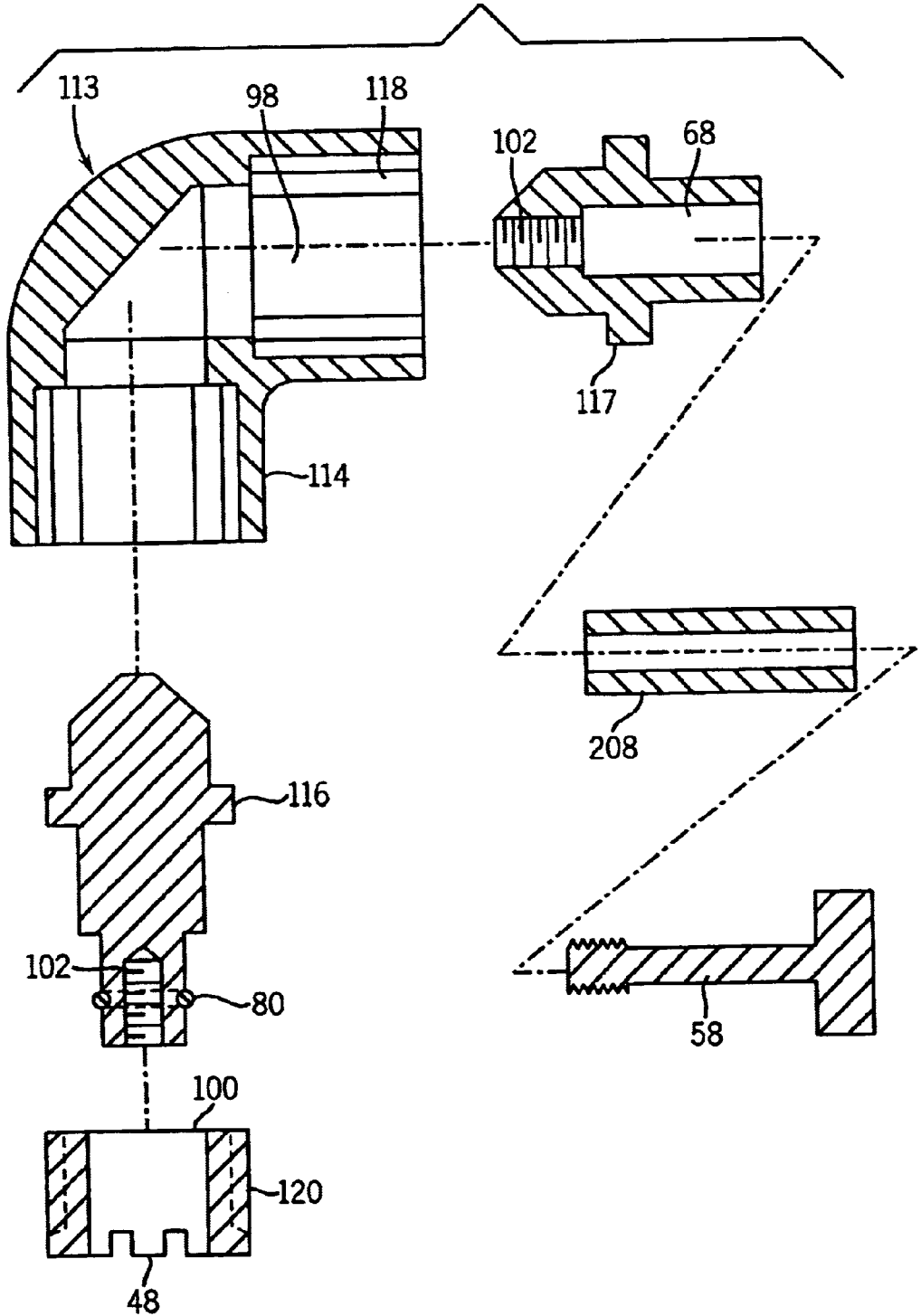
FIG. 14 is an exploded, sectional view of the triple tool.

In a secondary design, the final drive element, shown in FIG. 14 as male drive gear 116, can mate directly with the internal square drive 68 of a CDT and use a retaining screw 58 in threaded hole 102 for attachment.

In a third design, an "internal bolt" system provides a square body member 208 with a through hole to permit insertion of a retaining screw 58 for attachment to the bottom threaded hole 102 of a "blind" internal square drive 68 in female drive gear 117 that does not extend through the tool.

Threads have been chosen as the lengthwise retention method due to the fact that they may be loosened slightly for angle adjustment without the two tools coming "completely apart".

These novel attachment systems allow the operator to adjust quickly for any angle desired and provides rotation and torque-transmission through the connecting joint of two or more combined tools.

Rotation of connected tools does not loosen bolt or nut because connected members are effectively locked together internally by the square portion of the attachment system and will rotate together as one unit.

Any torque-transferring shape may be used for this purpose other than the square shape illustrated.

Description—Angle Tools

Still other embodiments of the present tool are shown in FIGS. 5, 5A, 6 and 6A. These embodiments contain gear drive mechanisms 95 as part of an output sprocket 94 and final drive gear 96. Voids 98 cast within the tool housings 30, 32 to accommodate these items are formed by angled slides incorporated into the die design, a well known technique to someone skilled in the art of die casting or molding.

The housings for the angle tools support the final drive 96 to provide non-binding angular operation.

Figure 7:
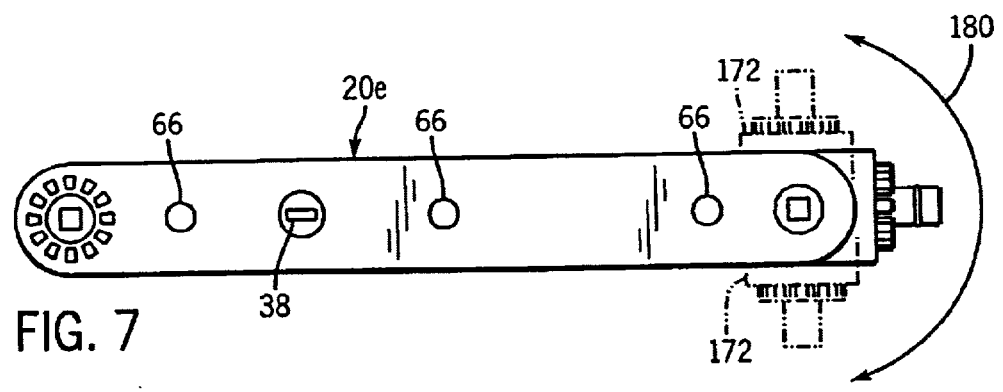
FIG. 7 is a top view of FIG. 6 showing in phantom lines different angle configurations.

Also, the housing and the final drive can be configured to provide the final drive output at different angles to the tool body as shown in FIG. 7.

Figure 6A:
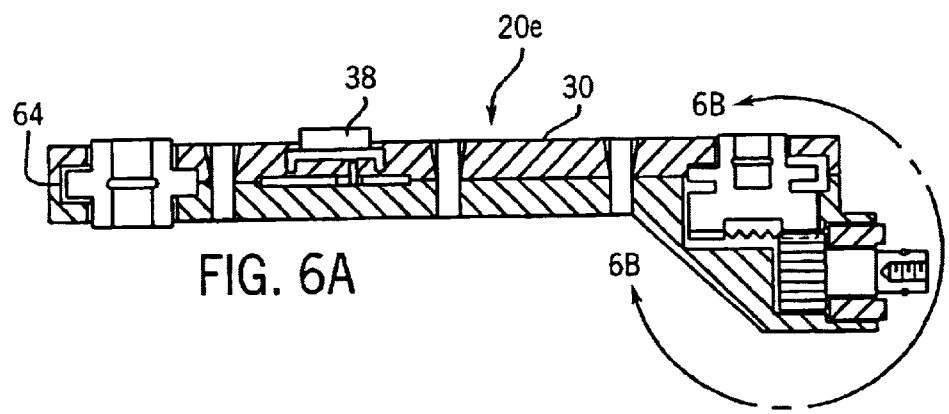
FIG. 6A is a sectional view taken on line 6A—6A of FIG. 6.
Figure 6B:
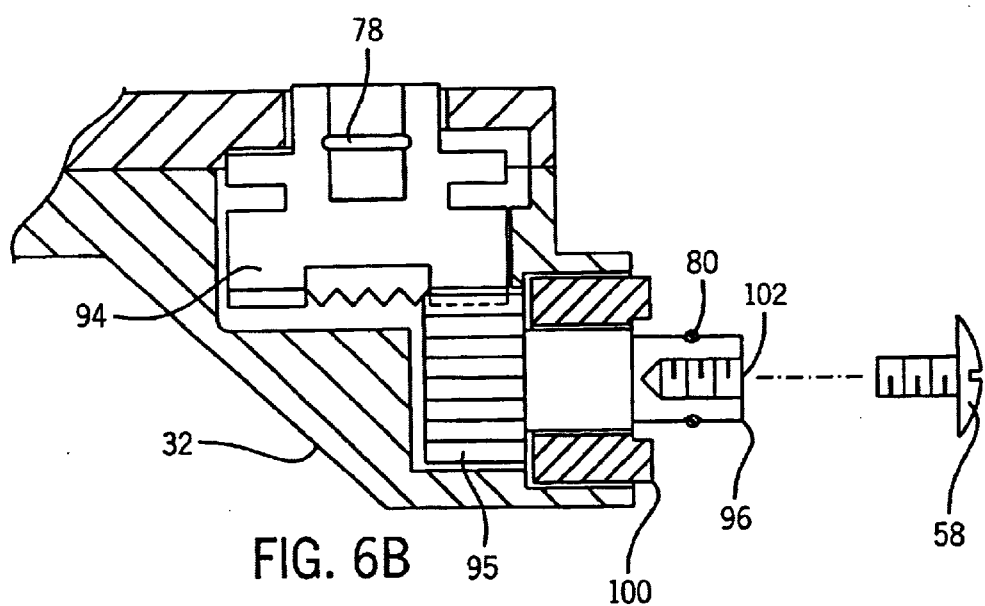
FIG. 6B is an enlarged detail view taken on FIG. 6A.
Figure 13:
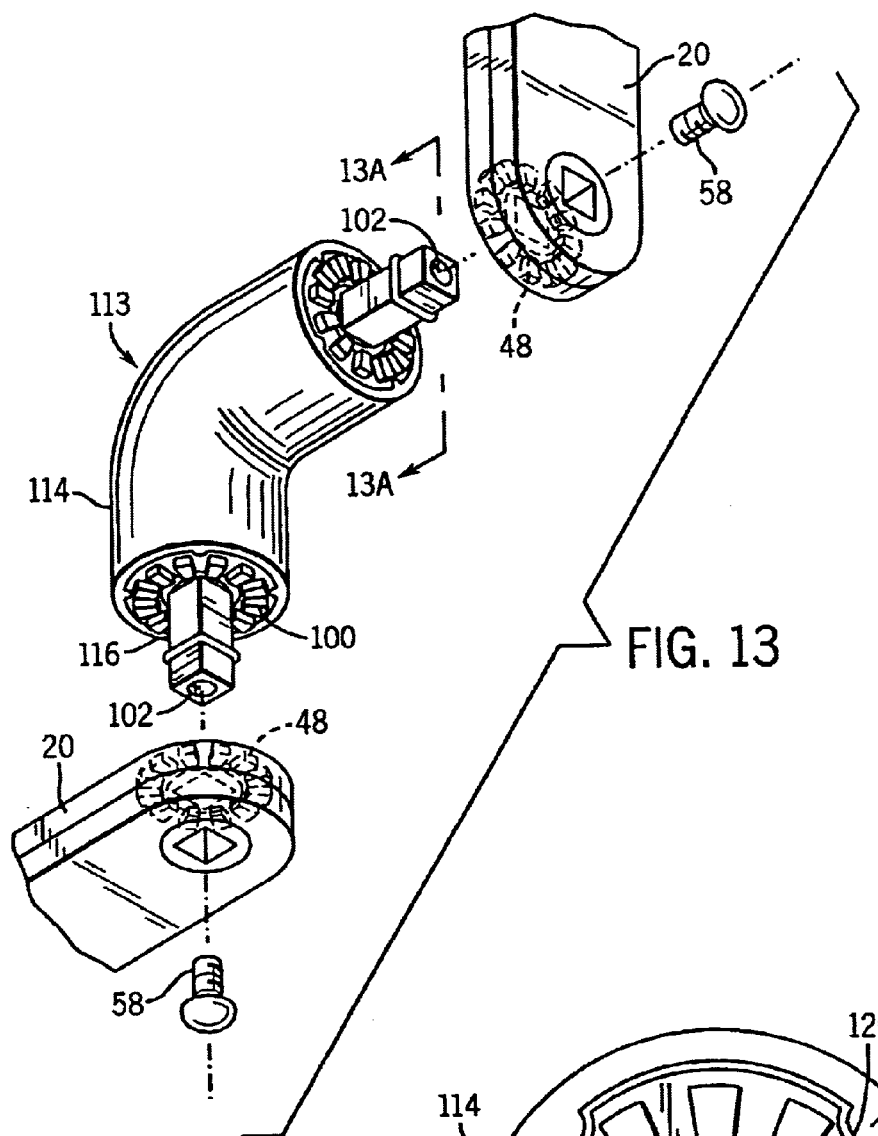
FIG. 13 is an exploded view of a triple tool.
Figure 13A:
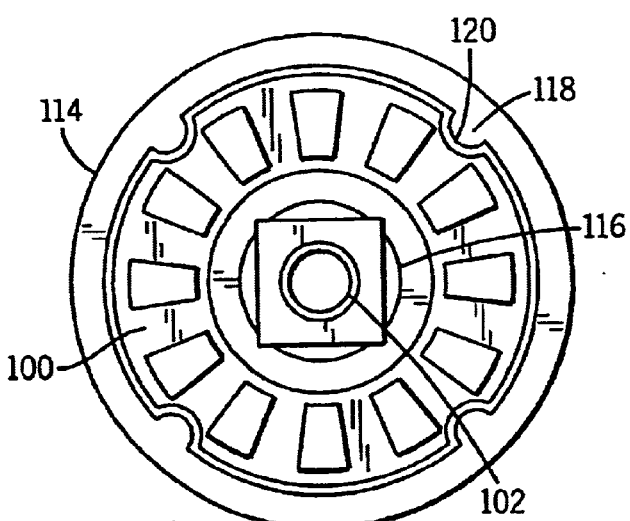
FIG. 13A is a end view taken on line 13A—13A of FIG. 13.

As an optional feature, a lug interlock end plate 100 can be integrally formed, press fit or otherwise mounted on or to housing 32, as illustrated in FIGS. 6A, 13A to provide strong, permanent means for non-rotating attachment of the housing 32, FIG. 6A; (114, FIGS. 13,13A) to the housing or body of another tool, an extension or other object for transferring rotational forces therebetween.

As also illustrated in FIG. 13A, the anti-rotation lugs 118 in the housing are provided with corresponding voids 120 in end plates 100 to prevent movement of the end plate 100 when the tool 20 is used as a connector for other tools. A retaining screw 58 is used for attachment to the final drive gear 96, FIG. 6A, to allow function of the lug interlock as while allowing rotation of the internal chain 34 and sprockets 36. Threaded hole 102 in final drive gear 96 provides an attachment point for a screw with an external hex for driving with an electric drill or screwdriver. A drill chuck may also be attached in this manner or a drive coupling with an internal square configuration may be used. A square final drive is illustrated as it accepts conventional sockets, etc. in the well-known manner.

A female drive gear 117, FIG. 14, may also be utilitized that provides an attachment point at bottom of internal square drive 68 via a threaded hole 102 at bottom of gear (or sprocket) and uses the "internal bolt" attachment system 58, 208.

Description—Chain Drive Power Tools

The present housings 30, 32 can be easily designed to incorporate electric (20f, FIG. 1D), pneumatic or fluid drive mechanisms making them into chain drive power tools.

The manual operation modes (self-ratcheting and driven by another tool) can still be maintained for added versatility.

Figure 1B:
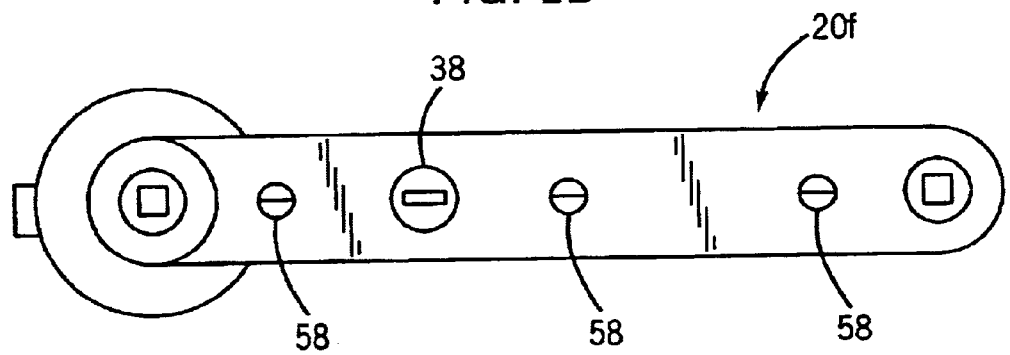
FIG. 1B is a top view of a powered master tool.
Figure 1C:
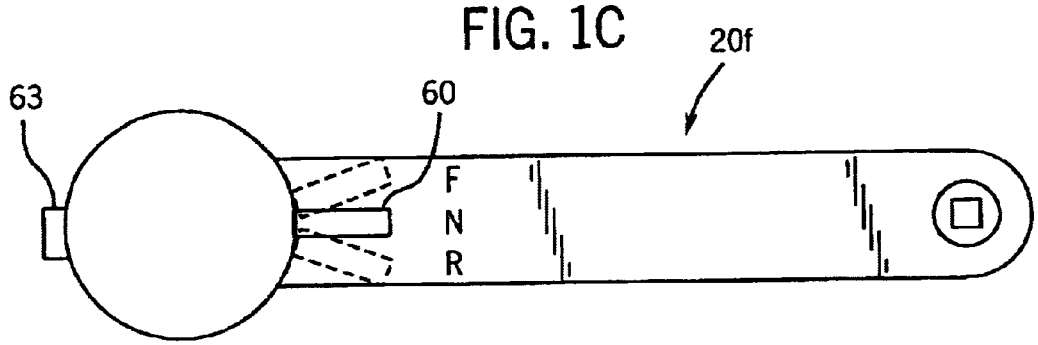
FIG. 1C is a bottom view of the powered master tool.
Figure 1D:
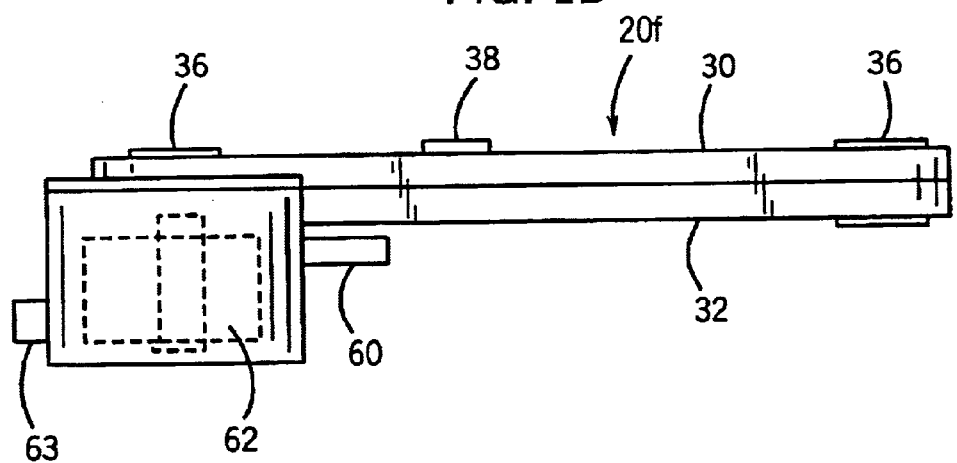
FIG. 1D is a side view of the powered master tool.

Another preferred embodiment is shown in FIGS. 1B, 1C and 1D with the bottom housing 32 elongated on the operator end 31 to provide space for a rotational power source 62 and a power switch 60 for energizing the power source 62. Housings 30, 32 can be connected together by male bosses 50 and tapered holes 46, as shown in FIGS. 1A, 2B, 2C, or by snap fit as shown in FIGS. 8A and 8B. Retaining screws 58 can also be used for attaching housings to provide for power source maintenance and service, FIG. 1B.

The strength (and weight) of the power source 62 can be minimized by using the forward and reverse positions of the selector switch mechanism 38, 40 to "final tighten" and break loose items manually in lieu of using the power source 62 for these functions. A secondary drive tool may also be used for this purpose as both sprockets 36 still retain their internal square drive 68 feature.

Description—Mechanical Advantage Tools

Figure 1E:
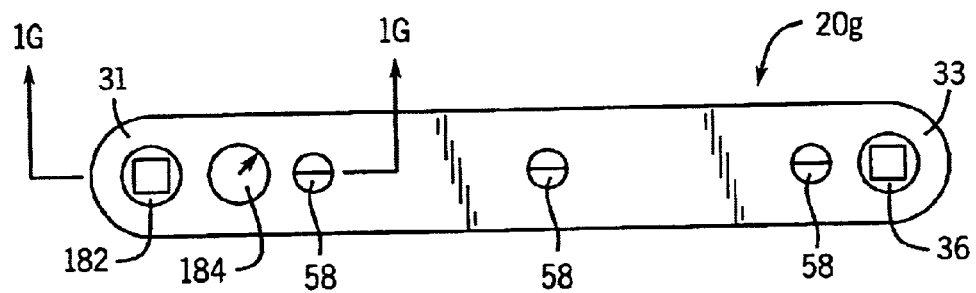
FIG. 1E is a top view of the master tool with a hydraulic drive assist mechanism.
Figure 1F:
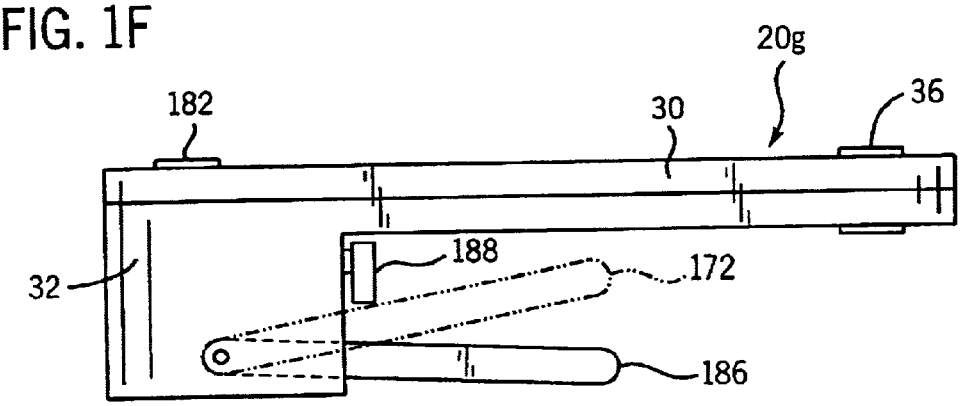
FIG. 1F is a side view of the master tool with the hydraulic drive mechanism.

In the same manner as the power tools, the housings 30, 32 can enclose a mechanical advantage electrical, fluid such as hydraulic or pneumatic, or physical drive assist mechanism. FIGS. 1E and 1F.

The hydraulic design illustrated facilitates breaking loose or tightening objects by means of applying a mechanical advantage to the hydraulic sprocket 182 (preferred) or chain.

Figure 1G:
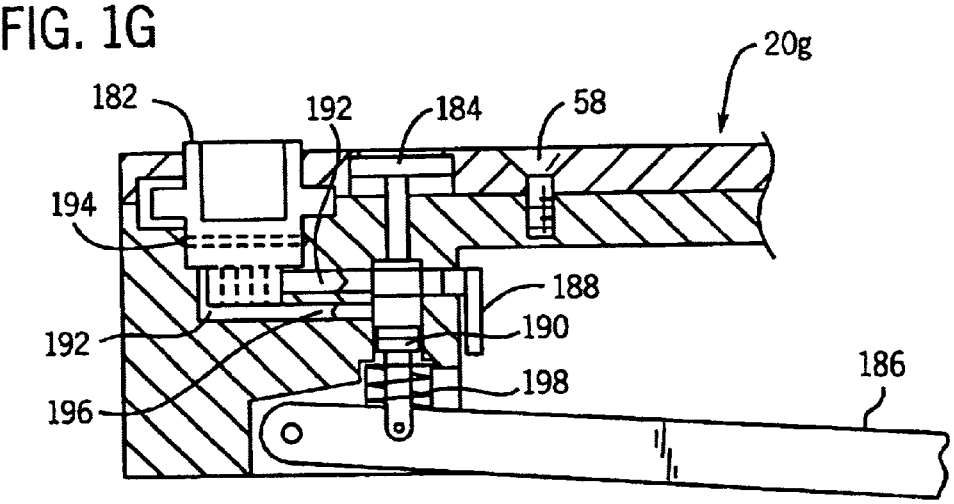
FIG. 1G is a sectional view taken on line 1G—1G of FIG. 1E.

Operation of a lever 186 moves piston 190 applying hydraulic pressure through passageways 192 to provide additional torque to hydraulic sprocket 182. FIG. 1G.

Hydraulic switch 188 can be rotated to change direction of applied force to either side of hydraulic sprocket 182 or placed in the neutral position for manual operation of tool 20g.

Hydraulic sprocket 182, piston 190, gage 184 and hydraulic switch 188 contain seals 194 to contain hydraulic fluid.

Passageways 192 contain one-way valves 196 well known to someone skilled in the art of fluid power mechanisms.

A gage 184 may be incorporated to measure applied force (by converting pounds per square inch to foot-pounds) for securing bolts to a specific torque setting.

Housing 30, 32 can be connected together by male bosses 50 and tapered holes 46, FIGS. 1A, 2B, 2C, or by snap fit as shown in FIGS. 8A and 8B. Retaining Other designs including, but not limited to, gears, tapers, and threads may be used to transmit mechanical force to the internal drive system at the operator end 31 for novel use at the working or output end 33.

Description—Secondary Tools

A separate right-angle or compound angle, called a triple tool 113, is a secondary tool designed to be used separately or in conjunction with the tool system. This novel tool is comprised of a one-piece outer housing, two drive gears and two end plates, as shown in FIGS. 13, 14. Second end plate is not shown on FIG. 14, but is typical on each end of tool.

The outer housing 114 is molded or cast as one piece with internal voids 98 formed by angled slides incorporated into the die design as well known to someone skilled in the art of die casting or injection molding.

Drive gears 116 can be cast with gears at one end and an external square drive at the other and further include an internal hex (not shown) or threaded hole 102 for securing tools and using the lug interlock system 48.

Female drive gears 117 can also offer an internal square drive 68 with threaded hole 102 to retain the "internal bolt" attachment system (208, 58 FIG. 14) as needed.

End plates 100 contain a hole for retaining and supporting the drive gears and are sized to be press-fit into internal voids 98 in outer housing 114. Outer housing and end plates contain matching anti-rotation lugs 118 and voids 120 to support angle-adjustment of lug interlock system 48.

End plates 100 provide the raised lug interlocks 48 required for attachment to other tools as shown in FIGS. 13, 13A and 14.

The triple tool 113 may also be manufactured at angles other than the right angle version shown, and with or without lug interlock system 48.

As shown in FIGS. 19, 19A and 19B, another separate secondary tool, which is a combination tool 21, can also be used separately or with the Chain Drive Tool System. This novel tool is comprised of a formed tube 160, a cross member 164 and a drive adaptor 90 accessory.

Formed tube 160 is one piece, injection-molded or cast, and provides an internal spark plug hex 166 at the operator end 31 and an internal square drive holder for use of the drive adaptor 90 on the working end 33.

Drive adaptor 90 can also be manufactured as part of formed tube 160 as desired.

The formed tube 160 also provides cross-holes 167, which can be square or round, for insertion of the cross member 164 therethrough.

The cross member 164 can be round or square (preferred) and has one end 165 flattened to be used as a flange for tapping with a hammer for loosening/tightening purposes.

Rubber or polymeric O-rings 162 provide a means of securing or adjusting the cross member 164 when in use. The drive adaptor 90 contains "Snap-Spring" 80 retention system and also provides an internal hex 84 for use with conventional screwdriver tips.

Figure 27:
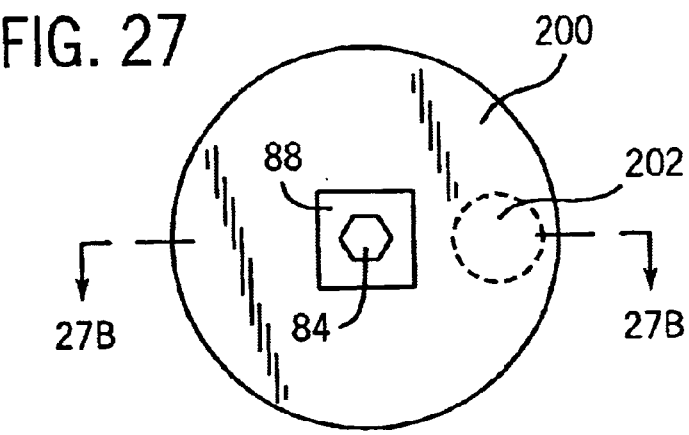
FIG. 27 is a top view of a hand wheel usable with the master tool.

Another secondary tool, the hand-wheel, 200 is a one-piece molding or die casting that provides a low profile outer diameter for hand operation. FIG. 27.

The male square drive 88 provides a means of driving CDTs or conventional sockets and extensions with the matching internal square feature.

An internal square (not shown) may also be used to further utilize multifunction adaptors.

The incorporated internal hex 84 allows the hand-wheel to be used separately with hex screwdriver bits as a short screwdriver.

Additionally, the internal hex 84 may be used as a drive adaptor to allow driving by conventional hand and power tools with standard hex bits.

The circular indent 202 provided in the face of the hand-wheel 200 allows user to insert tip of thumb or finger for rotational operation of a Chain Drive Tool (CDT) sprocket.

A "flip-out" or insertable handle (not shown) may also be added to increase the handwheel leverage and speed.

Description—Accessories

Figure 18:
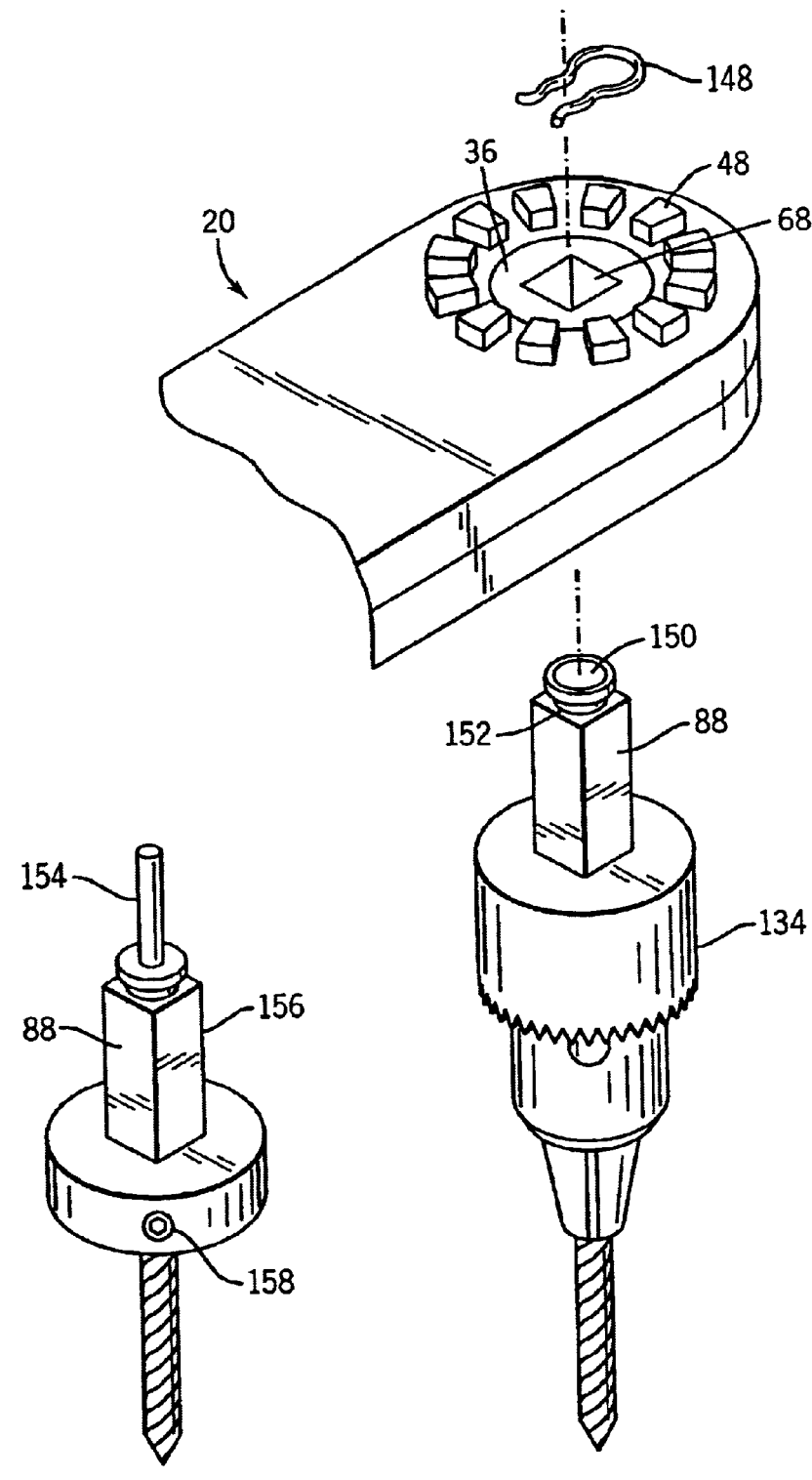
FIG. 18 is an exploded view of a quick change collet and drill chuck.
Figure 20:
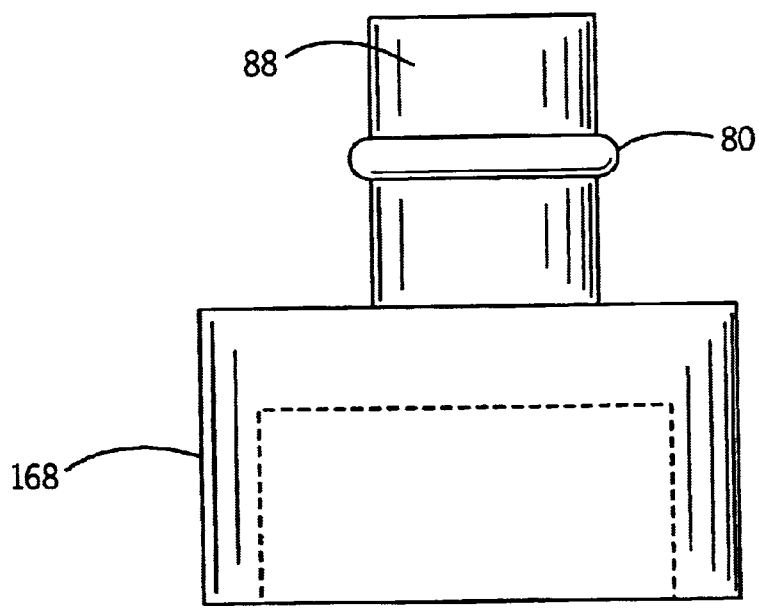
FIG. 20 is a side view of a shorty socket.
Figure 20A:
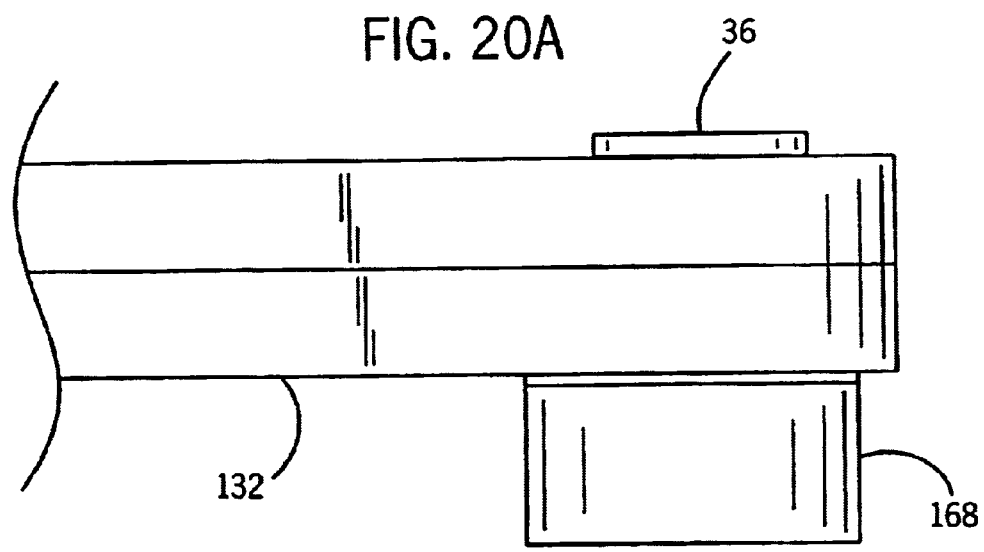
FIG. 20A is a partial side view showing the shorty socket inserted in the master tool.

Accessories can include adaptors to accommodate larger and smaller square drive tools, male and female hex adaptors for screwdriver and electric drill operation, quick-change drill chucks 134 and collets 156 FIG. 18, and extremely short sockets 168 and male hex (allen) drives (that incorporate a integral male square drive for insertion into a CDT), as shown in FIGS. 20 and 20A.

Figure 28:
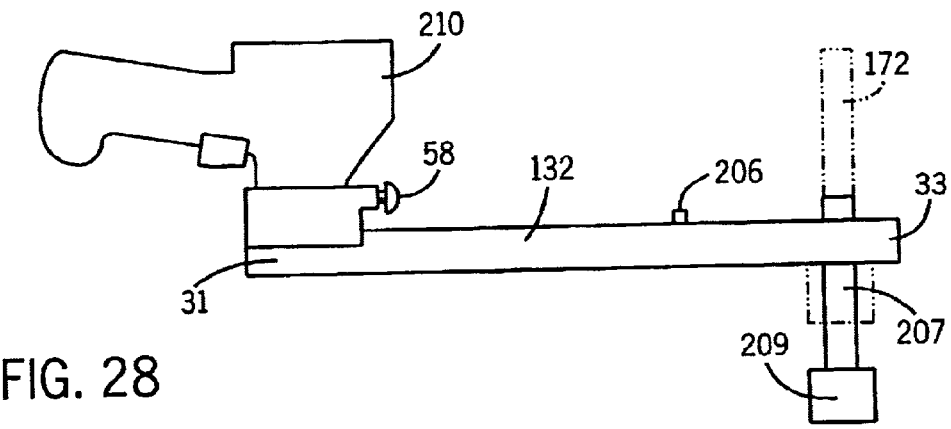
FIG. 28 is a side view of an impact tool attached to a master tool with a sliding extension installed therein.

Economical square extensions of various lengths (not shown) can be utilized with any CDT equipped with through holes in sprockets. This allows tools to be moved up or down extension to the best operating location for novel operation and can be also be combined with existing extensions, sockets and flex joint drive couplings. As shown in FIG. 28, a square extension 207 may be directly inserted into any mating female square drive. In addition, any tools with through square holes in sprockets 36, FIG. 28B, allow the extension to be slid through the tool to the best operating position as illustrated by phantom lines 172, FIG. 28.

Figure 4B:
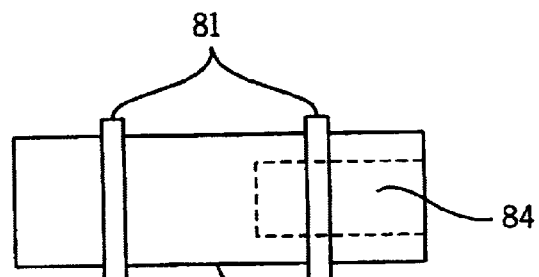
FIG. 4B is a side view of a drive adaptor and snap spring.
Figure 4C:
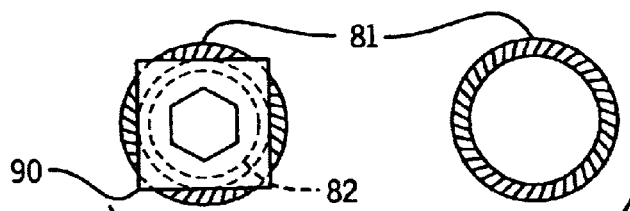
FIG. 4C is an end view of a drive adaptor and snap spring.

A tool-retaining system comprised of an internal or external snap-spring 80 or 81 and a mating groove 82 as shown in FIGS. 4A, 4B and 4C.

The snap-spring is manufactured from suitably high-tension material and may be formed as a circular coiled spring 81, or a C-shaped Snap-Spring 80.

Spring tension, due to a slight interference fit with object tool or internal square of a CDT sprocket, provides holding function and operation can be accomplished with moderate hand force.

This system provides an economical method for tool/adaptor retention as well as functioning with conventional sockets and extensions.

Adaptors, drive gears, sprockets etc. can also be magnetized for tool holding as needed.

Common Enhancements

Figure 28A:
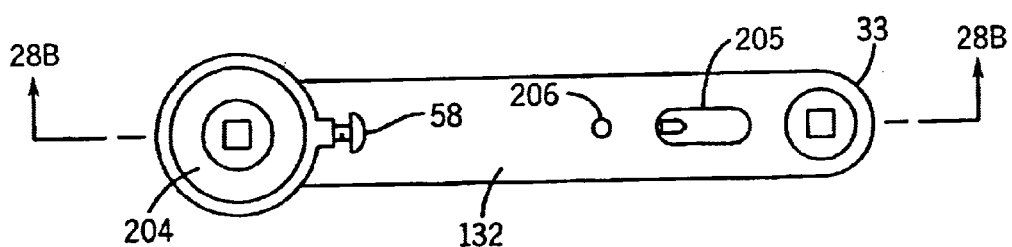
FIG. 28A is a top view of the master tool provided with a light source and a light switch.
Figure 28B:
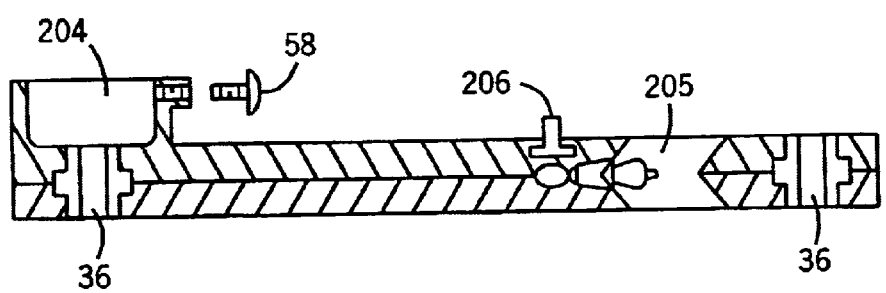
FIG. 28B is a sectional view taken on line 28B—28B of FIG. 28A.

The following features listed are further common enhancements intended to increase the functionality of the previously described tools:

1. The base material of components may be alloyed or combined with other elements to assist friction reduction and reduce wear.
2. Tools can be chromed, anodized or otherwise chemically treated or coated to reduce friction and wear.
3. Where space permits inside housings, an illuminating light source can be contained to increase convenience. As shown in FIGS. 28A and 28B, the design of the tool housings allows incorporation of a light switch 206 and light source 205 near the output end 33.
4. Tools may have external (male) or internal (female) drive configurations as desired by customer.
5. Square bolt and nut attachment system can be designed as shown in FIG. 12 or with a secondary internal bolt design (FIG. 14) or with just a retaining bolt and integral male square drive (FIG. 13) to function with either male or female drive configurations, allowing lug interlock angle-adjustment system to operate.
6. Housings and drive elements of basic CDT, can be designed to attach directly to existing power tools by conventional means in a manner similar to the machining applications thereby extending their reach and utility. As shown in FIGS. 28, 28A and 28B, the housings of these tools may be designed to attach directly to existing tools such as, but not limited to, the impact tool 210 illustrated.

A slip fit connection 204 (28A and 28B) allows the existing tool to be directly inserted and held in place by tightening a retaining screw 58. The male square drive of impact tool 210 mates with the female internal square of the sprocket 36 in the chain drive tool to provide transmission of rotary motion.

Other shapes and types of connection and retention systems may be utilized to take advantage of the economical method of force transmission and output relocation provided by the tools herein claimed.

7. All items intended to be grasped by hand may offer a non-slip surface by texturing or otherwise offering a raised or contoured surface as part of the mold or die design.

Description—Systems

The preferred entry-level or starter Chain Drive Tool System would preferably contain the following:

A. Straight power or mechanical advantage tool 20f, 20g with selector switch, FIGS. 1B, 1C, 1D, 1E and 1F.

B. Compound angle tool 20d with selector switch, FIG. 5.

C. Straight slave tool 20b, FIG. 3, for forming angles and joining multiple tools together using the lug interlock system 48.

D. Tapered tool 20c, FIG. 4, for increased access.

E. Square bolts 110 (FIG. 12B) and various adaptors (FIGS. 4B and C) to connect and operate.

F. Hand-wheel 200, FIGS. 27, 27A and 27B.

A more complete Chain Drive Tool System would also include right angle tool 20e (FIG. 6) and separate angle drives (triple-tools 113, FIG. 13) along with quick-change drill chuck 134 or collets 156 (FIG. 18). Also included would be additional drive and accessory adaptors, shorty sockets 168, FIG. 20 and male hex drives (not shown) and the combination tool 21 (FIGS. 19 and 19A).

Note also that standard ratchets, drives, extensions, hex-bit drills, screwdriver tips, etc. can be used as needed with this novel tool system.

Description—Additional Embodiments

Machining adaptations can include bearings in housings 30, 32 or sprockets 36 and higher strength chain and housings. Housings 30, 32 may be held together by bolts and helicoil inserts (not shown, which provide hardened threads for repeated use).

Figure 15:
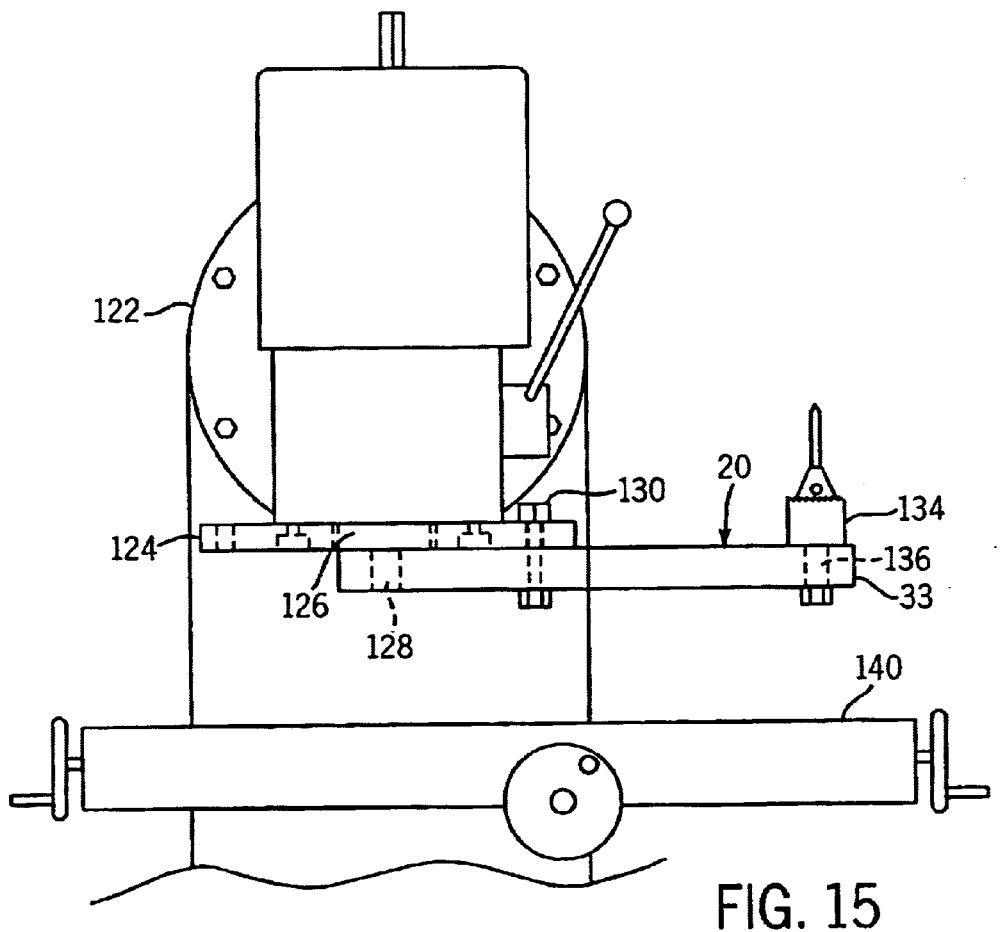
FIG. 15 is an elevational view of a milling machine application utilizing the present invention.

Internal sprocket configurations can provide a machine (Morse) taper for standard collets use. FIG. 15, 136.

Figure 16:
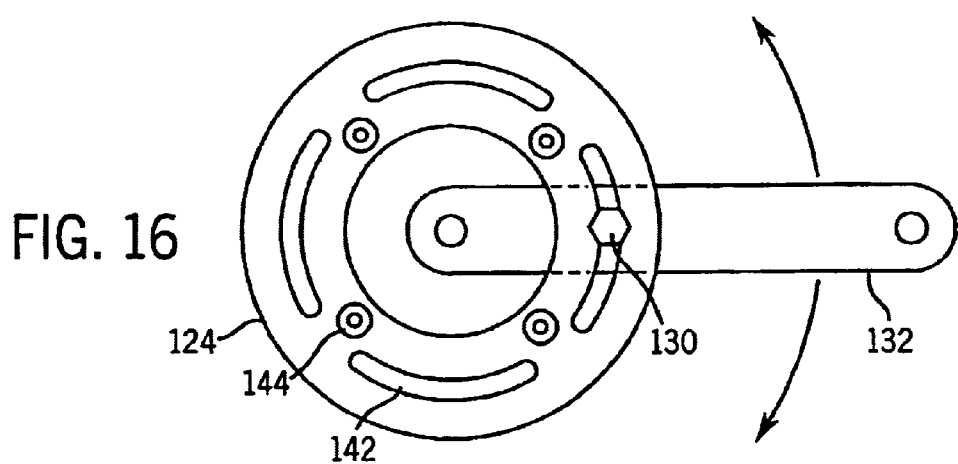
FIG. 16 is a top view of a quill bracket used in FIG. 15.
Figure 17:
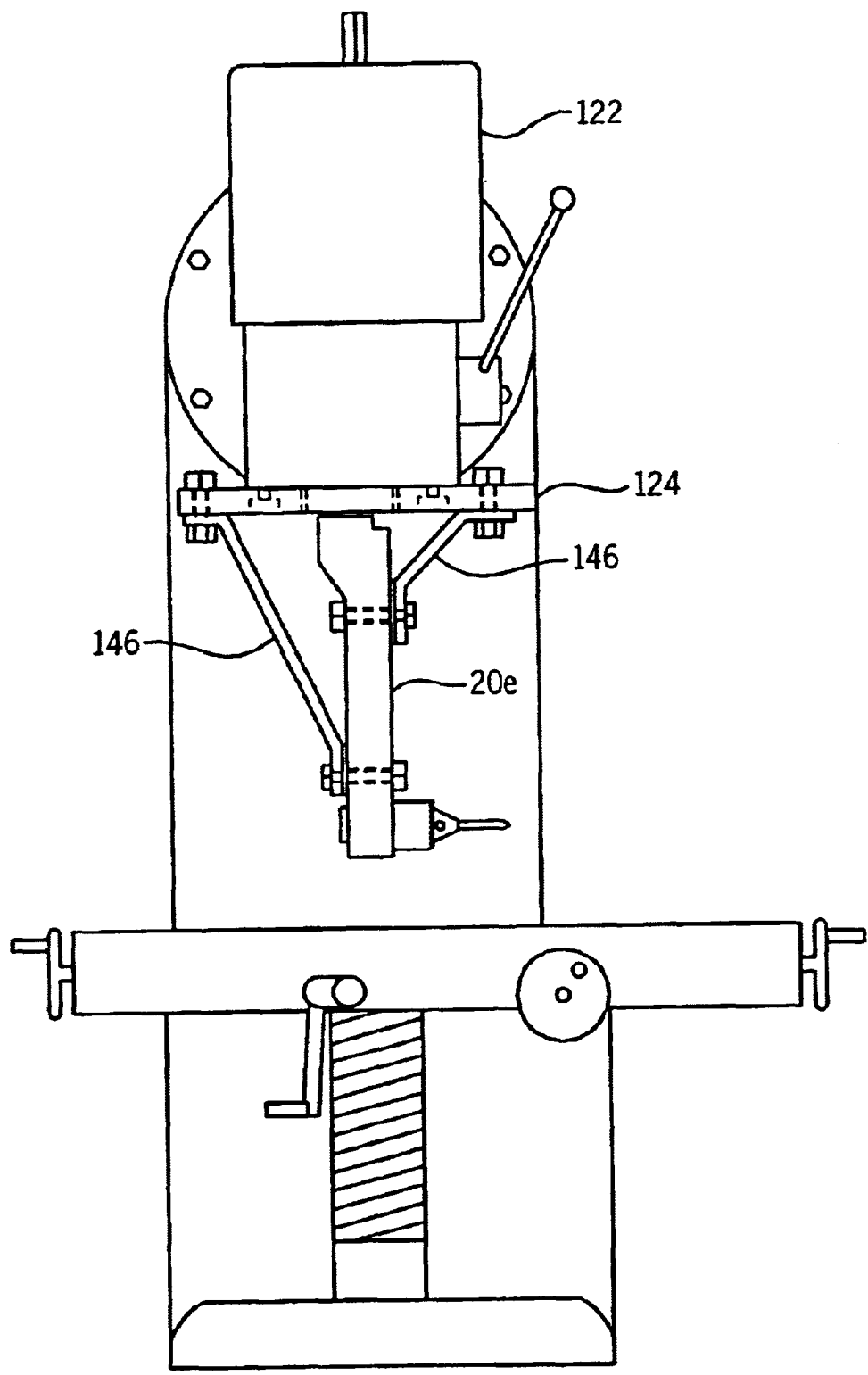
FIG. 17 is an elevational view of a milling machine application utilizing the right angle master tool.

Attachment systems, as shown in FIGS. 15, 16 and 17, could be provided for adaptation to various machine tools.

Description—Alternative Embodiments

Power versions may also include piezoelectric or other ignited gas systems or compressed gas devices as a power source. (Similar to impulse nailers or air rifles.)

Permanently angled tools 20a, FIG. 2, can be cast at various angles and lengths as needed for special applications.

The output end drive sprocket 104 of any tool version, FIG. 8, may be sized internally as desired.

Smaller tools can be injected-molded, using lightweight material as shown in FIG. 8.

Larger versions would contain correspondingly larger chain, sprockets and housings with bearings or PTFE bushings for interface with the mounting surfaces of the housing to reduce friction under load.

Tools can also be designed to produce combinations of any of tools shown in FIG. 1 through FIG. 7. Customers may prefer a permanently angled tool 20a with a tapered end or a permanently angled tool 20a with a compound or right angle end. Tools may also be designed with compound or right angles on each end due to the fact that each rotating member contains its own square drive.

The triple tool 113 may also be manufactured at angles other than the right angle version shown and with or without lug interlock system 48. This tool may also incorporate drive gears with internal squares at one or both ends.

Figure 5A:
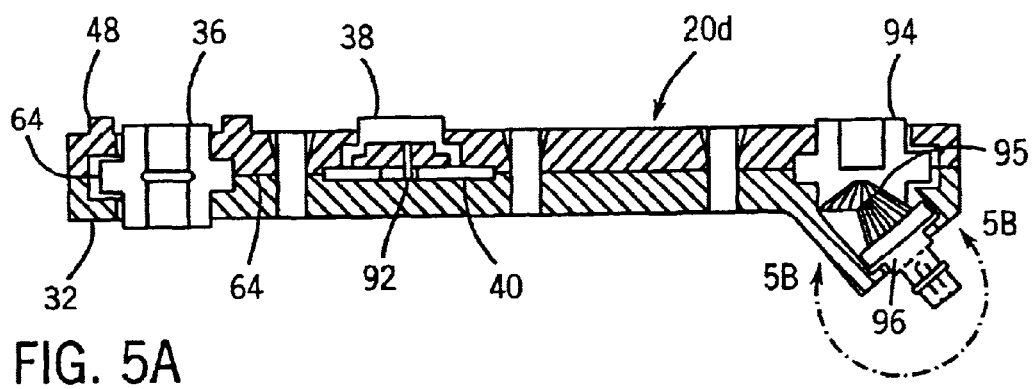
FIG. 5A is a sectional view taken on line 5A—5A of FIG. 5.

Right and compound angle tools 20d, 20e may also incorporate this internal square drive 68 feature in the final drive gears 96 in place of the male square drive 88 shown in FIGS. 5A and 6A. A threaded hole 102 at bottom of internal square drive 68 provides an attachment point for a two-part "internal bolt" system 208, 58 allowing connection to other tools equipped with the lug interlock system 48 as shown in FIG. 14.

Tools may also be assembled using conventional screws, rivets, press-fits, etc. in place of preferred system shown.

The outer housings 30, 32 can be modified to include a light-emitting source 205 near the output end 33 to increase visibility or to include recesses for holding tool adaptors or screwdriver bits, FIGS. 28A and 28B.

Housing, 30, FIG. 28 can also be modified to fit directly onto existing hand and power tools allowing additional versatility and reach for these tools.

The enclosed drive mechanism provided by CDT's further provides a safe means of rotary power transmission. Tools may be connected to any existing power source through one sprocket, with the second sprocket providing a point to connect an object tool, pulley or another CDT for use.

The square bolt 110, used in the tool connecting system, can also be lengthened to provide a mounting point (not shown) for a pulley or other object tool. The adjustable angle feature provided by the lug interlock system makes it ideal for science projects, prototypes or as an adjustable tensioning device for other drive systems.

An intent of the Chain Drive Tool System is to provide users with a tooling system far superior to any available prior art and be affordable for end users.

Operation—Driven Mode

As seen in FIG. 1A, ends of sprockets 36 containing internal square drives 68 and extend through outer housings 30 and 32 to provide access to other hand or power tools. Teeth of both sprockets 36 are engaged in endless roller chain 34. Rotation of one sprocket 36 turns the chain 34 which rotates the other sprocket 36 at the opposite end of the tool providing rotation to any object or tool attached to the driven sprocket.

The roller chain 34 is kept tight around the sprockets 36 due to precision chain tracks 56 and precise distance between sprocket bearing holes 44. The chain is pre-stretched for precise working length and durability.

The tool may be driven by hand or power tools including: electric drills and screwdrivers, ratchets, air ratchets, impact wrenches, etc., as needed.

Operation—Independent

Figure 22:
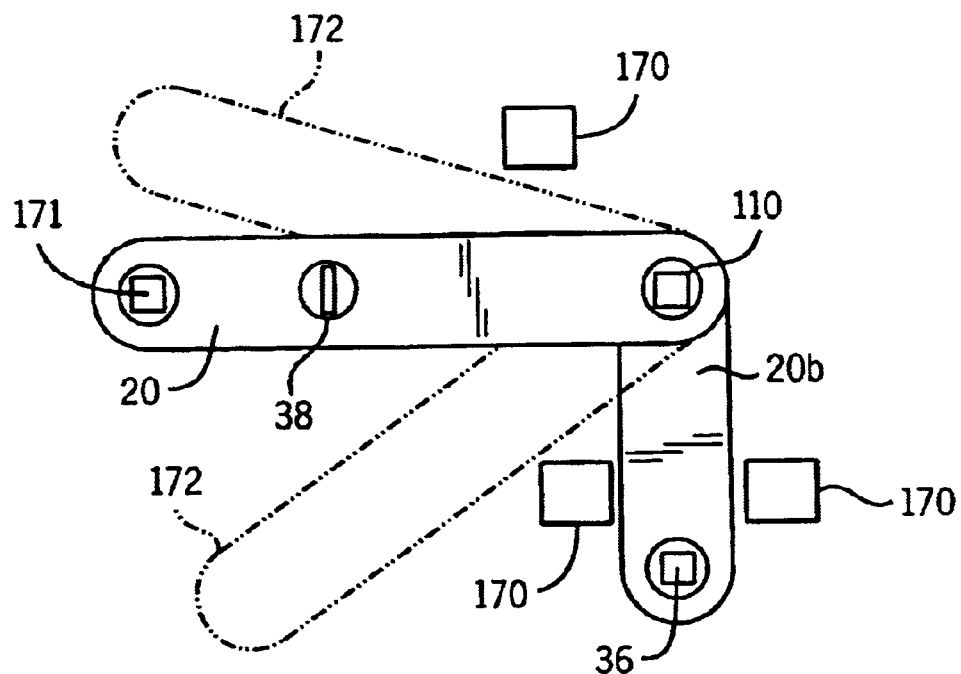
FIG. 22 is a view like 21 showing a ratcheting motion in phantom lines.

This invention will also operate in a normal self-ratcheting manner using the selector switch feature. FIG. 22. Selector switch mechanism 38, 40 offers three operating positions: forward, (for tightening) reverse, (for loosening) and neutral (to allow driving by another tool).

Operation—Lug Interlock

To adjust the angle, nut 112 (FIGS. 12, 12A) is loosened from square bolt 110 enough to disengage the lugs permitting tools to be adjusted to new angle and re-locked or joined together.

Internal bolt system 208, 58 (for blind holes) operates in a similar manner only the retaining screw 58, as shown in FIG. 14, becomes the adjustable member.

A direct male/female square connection can also be utilized as shown in FIG. 13, also using a retaining screw 58 for lengthwise assembly and adjustment.

Once joined, the two housings act as one unit, allowing self-ratcheting mode, driven mode or powered operation of entire combined unit.

Operation—Tools Combined by Lug Interlock

Figure 23:
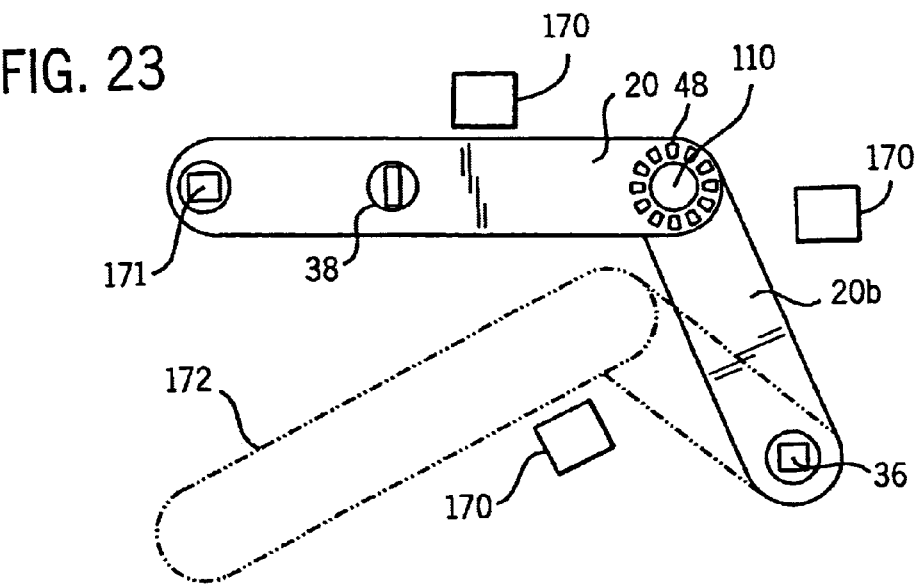
FIG. 23 is a view like FIG. 22 showing lugs connected.
Figure 24:
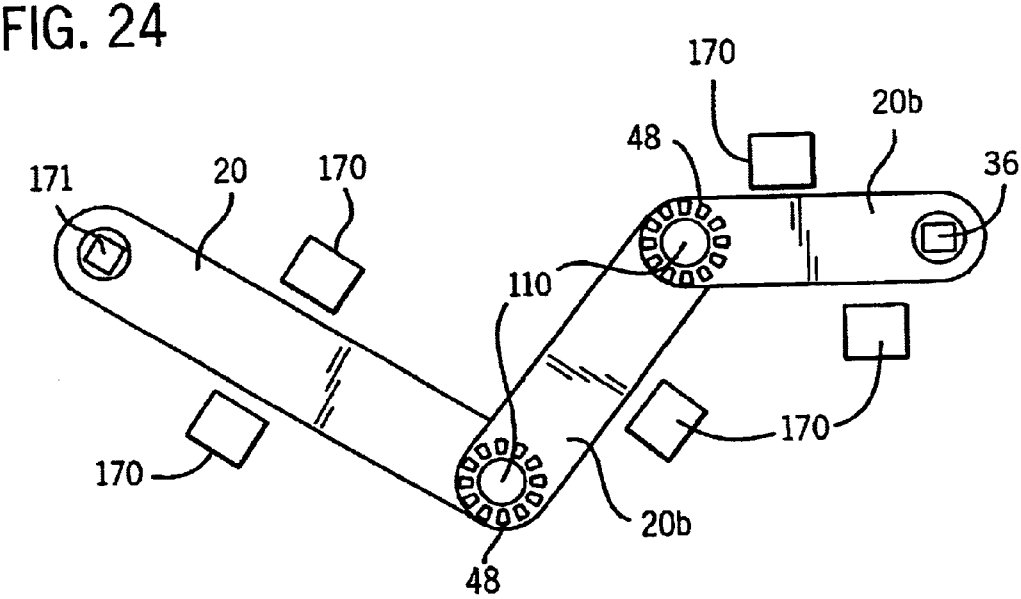
FIG. 24 is a top view of a combined master and slave tool with lugs connected in a driven mode.

Tools may also be driven at sprocket 171 in FIG. 24, (also FIGS. 21, 22 and 23) or be self-powered to drive second or multiple tools that are combined by the lug interlocks.

Tools combined by lug interlock act as one unit, which can be adjusted for desired angle, allowing unit to self-ratchet as shown in FIG. 23.

Tools combined with angled, compound angled or separate triple tools provide adjustable, compound angle access for all three modes of operation.

Operation—Angle Tools

For right and compound angle tools, the bottom housing 32 has been designed to accommodate output sprockets 94 with gear drive mechanisms 95 and final drive gears 96 as shown in FIGS. 5A and 6A.

Rotation of a drive tool to the input or output sprocket (both have internal square drives) rotates the final drive. Tools may also be self-powered or operated manually by use of the selector switch mechanism 38, 40.

Final drive contains a threaded hole 102 for attachment of other Chain Drive Tools using the lug interlock end plate 100 (press-fit into housing) and retaining screw 58 as shown in FIG. 6A.

Final drives may also provide the alternate internal square drive configuration.

Figure 5B:
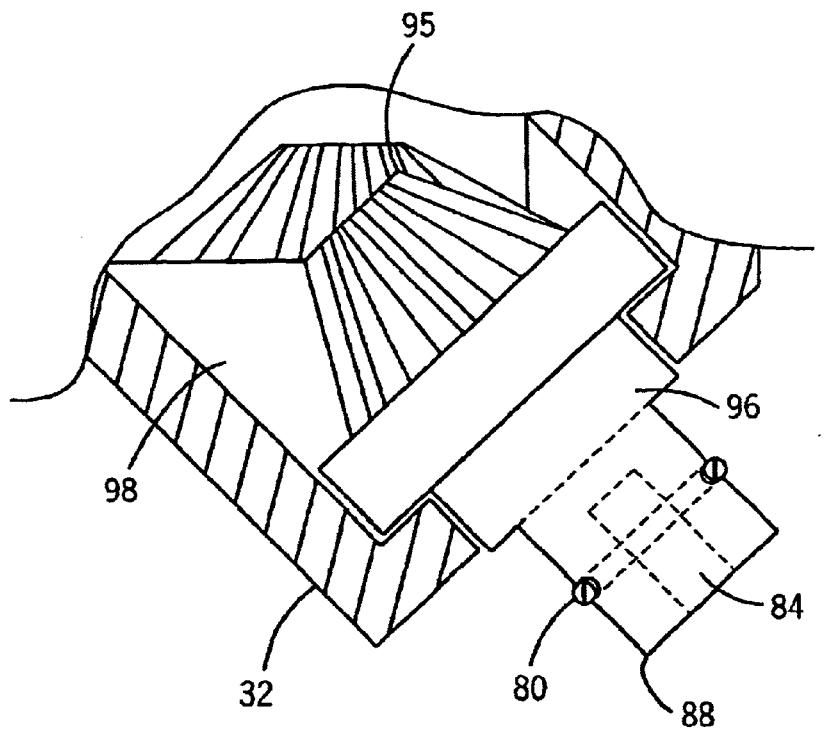
FIG. 5B is an enlarged detail view taken on FIG. 5A.

Final drives also contain the snap-spring tool holding system 80 and may incorporate an internal screwdriver hex 84 FIG. 5B in place of the threaded hole 102.

Selector Switch Operation

The switch button 38 includes the flexible eccentric tab 92 or another resilient, biasable element that extends into the central hole 106 of the switch plate 40, as shown in FIGS. 9–11. The flexible tab 92 is preferably rectangular in shape, and clearance is provided inside the switch button 38 so that the tab 92 may be resiliently biased or flexed toward the center of the switch button 38 as needed. The raised bar 43 on the switch button 38 extends through a hole 42 in the top housing 30 allowing finger operation.

The switch plate 40 is positioned by internal clearance slots 52 in the housings 30, 32 and contains teeth 41 which each include a front side 41a having an abrupt or concave shape and a sloped back side 41b.

Central hole 106 of the switch plate 40 has small notches 108 to retain the flex tab 92 at the forward, neutral and reverse positions as desired as shown in FIG. 10A.

With switch button 38 in its neutral position, as shown in FIG. 11A, flex tab 92 urges switch plate 40 firmly against one end of clearance slot 52 (Either location 91 or 93, depending on whether flex tab 92 is as shown or at a position rotated 180 degrees from the position shown) such that the switch plate 40 does not engage the chain 34, as shown in FIG. 11A. (Chain tracks 56 shown empty and switch button 38 superimposed for viewing clarity.)

When the switch button 38 is rotated 90 degrees right or left, the flex tab 92 is forced out of the original notch 108 and shuttles the switch plate 40 into the corresponding chain track 56 such that the teeth 41 of the switch plate 40 are received in the spaces between the rollers 35 of the roller chain 34. The flex tab 92 engages a corresponding notch 108 in the switch plate 40 and remains there as shown in FIG. 11B until another position or mode of operation is selected. (Chain tracks 56 shown empty and switch button 38 superimposed for viewing clarity.)

With the switch plate 40 in this position, ratcheting operation is possible. To illustrate, when the chain 34 is urged in a direction to apply a force against the abrupt or concave front side 41a of the switch plate teeth 41, the teeth 41 engage the chain 34 and the switch plate 40 transfers the force load directly to the housing at the ends of the clearance slot 52 generally at locations 91 and 93 by tilting slightly in the clearance slot 52. This prevents further movement of the chain 34 in this direction relative to the housing but allows the chain 34, the housing, and a socket or other object attached to a sprocket 36 of the tool, to be jointly rotated in the direction of the applied force.

Conversely, when a force is applied (or outer housing is swung)in a direction to urge the chain 34 against the back sides 41b of the teeth, a sufficient portion of the force is applied against the eccentric flex tab 92 to cause it to resiliently yield such that the switch plate 40 is moved or retracted toward the tool centerline and the rollers 35 of the chain 34 are allowed to pass over the teeth 41 of the switch plate 40 and the chain 34 to move relative to the housing in the direction of the applied force. With the switch plate 40 in the retracted position, the flexible tab 92 stores a portion of the applied energy while still urging the teeth 41 against the roller chain 34. When the chain 34 has moved sufficiently to align new spaces between the rollers 35 with the teeth 41, the teeth can be received in the spaces, or if the velocity of movement is sufficient, the rollers 35 can continue to pass over the teeth 41.

It is also contemplated that other structures can be used with or in place of the flexible tab 92 and switch plate 40 disclosed herein for allowing ratcheting operation of the present tool. For instance, another biasable member such as a spring could be used in cooperation with the tab 92 for urging the teeth 41 of the switch plate 40 against the chain 34.

Also, in place of the preferred mechanism shown, a two-part switch mechanism (not shown) can be made to interact with a sprocket 36 instead of the preferred chain.

Operation—Powered

A pneumatic, electric 62, fluid, compressed or ignited gas mechanism etc., is encased within a housing at the operator end of the tool as shown in FIG. 1D.

Forward, neutral and reverse of motor are accomplished by a power switch 60 located on the bottom of the tool.

Neutral position of the power switch allows the tool to still be operated in self-ratcheting and driven modes using manual selector switch mechanism 38, 40. Both sprockets still include internal square drives 68 for manual operation.

Operation—Mechanical Advantage Tools

The mechanism for providing the mechanical advantage is located on the operator end 31 for function as well as tool balance as shown in FIGS. 1E and 1F.

As lever 186 is contracted by hand force against tool body, as shown by phantom lines 172 (and returned by spring pressure) the self-contained hydraulic mechanism exerts additional force to hydraulic sprocket 182, internal drive and object tool.

Hydraulic switch 188 also can be rotated to control direction of motion required to tighten or loosen objects and also provides a neutral position to allow other modes of tool operation.

The function of the mechanism is similar to the operation of a common hydraulic "bottle" jack with the exception that the resulting drive force is rotationally applied to the internal drive system.

Operation—Lug-Free Side

Tools may be connected on their lug-free sides for allowing the master tool 20 to self-ratchet among obstructions 170 as shown in phantom lines in FIG. 22 using the selector switch mechanism 38, 40.

Figure 21:
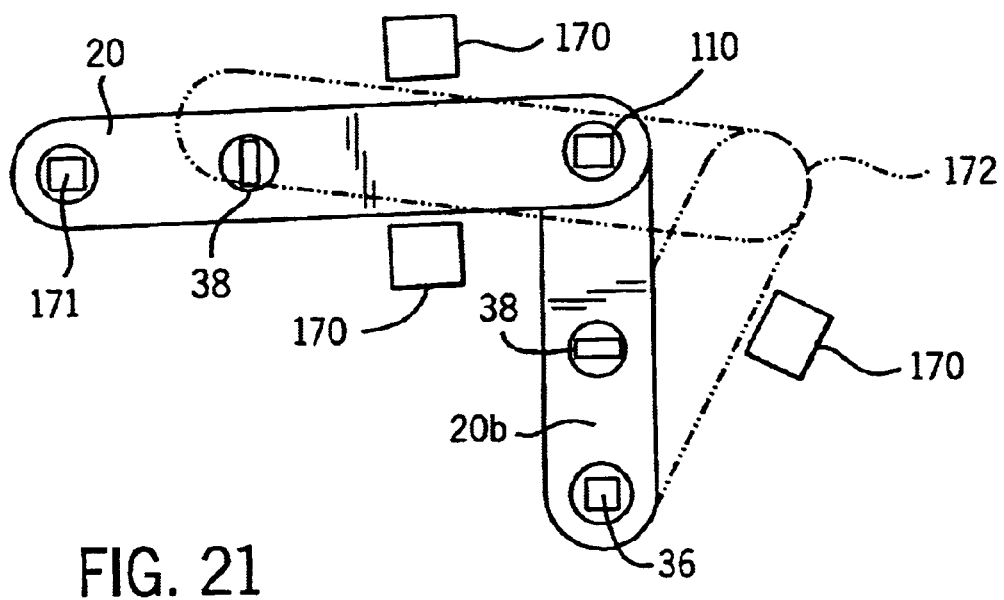
FIG. 21 is a top view of a combined lug-free master and slave tool showing push-pull motion in phantom lines.

The master tool may also be operated in a push-pull manner to generate rotation in the secondary tool using the ratcheting feature of the selector switch mechanism 38, 40 as shown in phantom lines 172 of FIG. 21.

For close or tight areas, an L-shaped rod 178 may be used to operate the tool in the same push-pull manner using the attachment holes 66 for a connection point as shown in FIG. 26A.

Attachment holes 66 also can be utilized to hold or initially place a tool in a confined space using a threaded rod 174 and a nut 176 as shown in FIG. 25.

Operation—Machine Tool Applications

The outer housing of the tools can be connected to stationary elements of a machine tool 122 using brackets or adaptors as shown in FIGS. 15, 16 and 17.

Conventional bolts 130 and spot faces 144 secure quill bracket 124 as shown in FIG. 16.

A drive tool is placed in spindle of machine tool (or as part of sprocket) to connect the drive spindle of the machine tool to the internal drive of the Chain Drive Tool as shown in FIGS. 15 and 17.

The tool can be rotated or mounted in different directions by use of adjustment slots 142 as shown in FIG. 16.

An object or tool is placed in a sprocket 36 at the far end 33 of the tool using a standard machine taper 136 inside the sprocket to provide the desired connection as shown in FIG. 15.

The object or tool performs work by utilizing normal three (four or five) axis movement of the machine bed 140.

This tool would not need a selector switch as the machine tool motor and switch will control output rotation.

Operation—Snap-Spring Tool Holding Feature

Drive accessories can provide the novel snap-spring one-piece tool retainer as shown in FIGS. 4A, 4B, 4C and 4D.

Figure 4D:
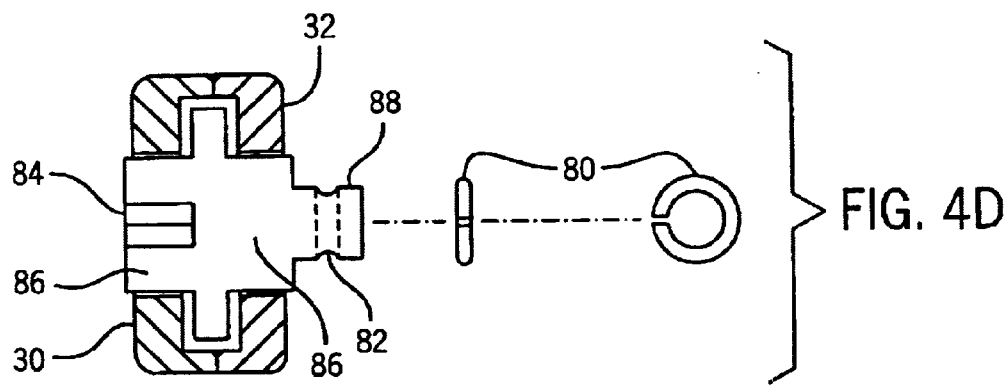
FIG. 4D is a sectional view taken on line 4D—4D of FIG. 4A.
Figure 5:
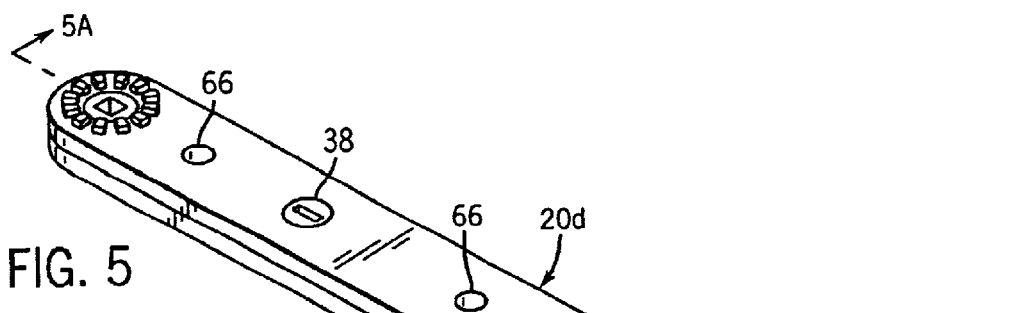
FIG. 5 is a perspective view of a compound angle master tool.
Figure 6:
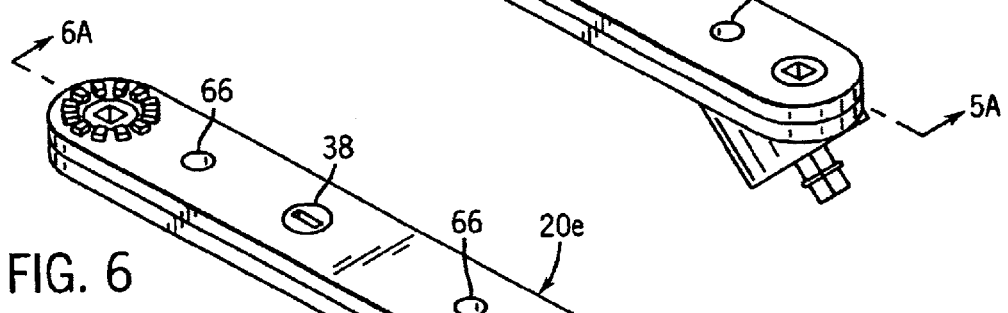
FIG. 6 is a perspective view of a right angle master tool.

A groove 82 with a round profile is manufactured into a drive accessory as shown in FIGS. 4A, and 4D. A circular, coiled snap-spring 81 can be expanded for assembly and is sized to slightly exceed size of square drive when placed in groove.

A C-shaped high tension snap-spring 80 with a round or tapered profile may also be utilized.

The internal diameter of the C-shaped spring 80 is slightly larger than the diameter of the groove 82 allowing the spring 80 to compress into the groove 82 when the accessory is pushed into a square drive hole. Gap in C shape also closes during compression.

When the spring 80 reaches the internal retaining groove 78 as shown in FIG. 3C, the spring 80 expands to its original shape, retaining the tool. Note that conventional sockets and extensions also contain this groove feature.

Sprockets 36 of Chain Drive Tools will also provide this internal retaining groove 82 for mating with conventional extensions as well as "snap-spring" system. FIG. 3C, item 78.

Spring strength and size allows installation and removal by moderate hand force.

Square drive adaptor 90 contains two "snap-springs" 81, one to retain drive into Chain Drive Tool, the other to retain an object tool such as a sprocket. FIGS. 4B and 4C.

Shorty sockets 168 and male hex drives (not shown) may also provide this novel feature. FIG. 20.

Operation Triple Tool

The triple-tool 113 FIG. 13 may be driven on one end by a standard ratchet (using a square coupler) or by another of the present tools to drive a socket at the other end.

Triple tool 113 may alternately provide internal square drives 68, FIG. 14.

The triple-tool 113 can also be driven by power tools to final drive screwdriver bits, hex-drills, etc. using appropriate adaptors.

The triple-tool 113 can also be used to connect other of the present tools at various angles (for instance for providing 360 degrees of rotation in two different planes) as shown in FIG. 13.

Operation—Combination Tool

The formed tube 160 with drive adaptor 90 can be used by hand as a square or screwdriver. FIGS. 19 and 19A (Due to internal hex 84).

The tube may also be reversed and the spark plug hex 166 in the handle used as an assembly tool.

A ratchet can be used in the square drive end to operate.

Cross-member 164 can be inserted into cross-holes 167 for T-handle operation or use of hammer flange 165 on cross member 164. Optional O-rings 162 help maintain and control location of the cross member in the tube. The cross-member 164 also stores inside handle by hand press-fit of cross-member 164 into hex 166.

Square (preferred) profile of cross-member 164 allows it to be used separately to drive ⅜ or ¼ inch square conventional sockets.

Cross-member 164 can also be inserted into cross holes in tube 160 and tube used as handle to exert additional force at socket.

Operation—Hand-Wheel

Figure 27B:
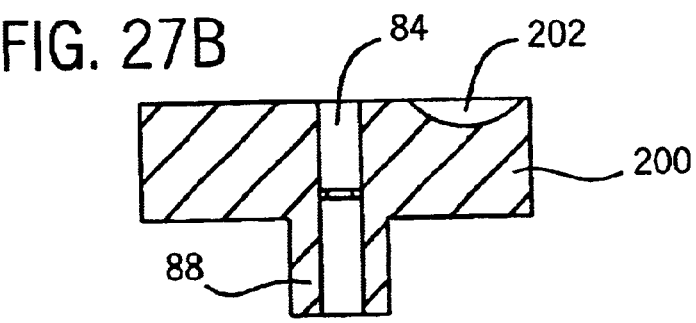
FIG. 27B is a sectional view taken on line 27B—27B of FIG. 27.
Figure 27A:
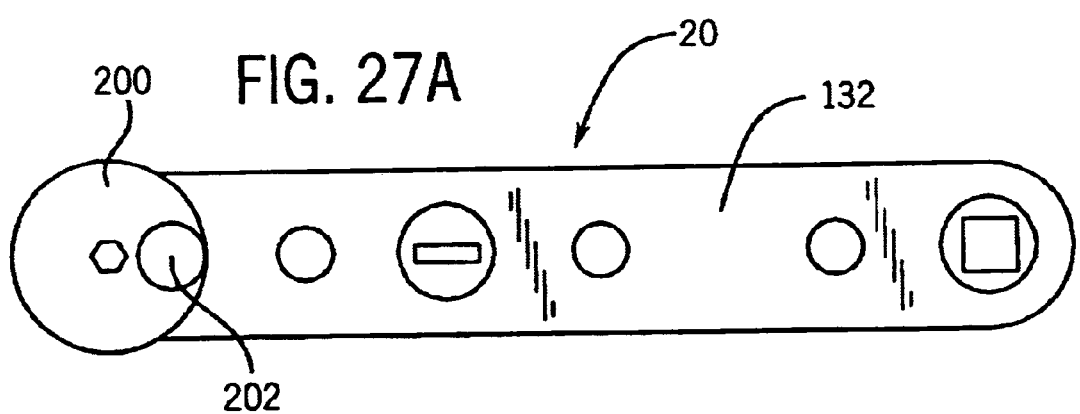
FIG. 27A is a view of the hand wheel installed in the master tool.

The formed outside diameter allows operation by hand to rotate CDTs (and conventional extensions and sockets) using the incorporated male square drive 88 FIGS. 27 and 27B.

The internal hex 84 functions as an adaptor to allow driving by other conventional tools equipped with a male hex driving tool.

The internal hex 84 also allows direct use of hex screwdriver tips allowing use of the hand-wheel 200 as a short screwdriver.

The circular indent 202 in the face of the hand-wheel 200 allows user to rotate tool faster (in a manner similar to that used when operating a fishing reel) by using the tip of a thumb or finger.

Operation—Quick Change Tools

Drill chucks 134 and collets 156 contain a male square drive 88 and also a round diameter groove 152 at the rear of the tool to retain a spring clip 148 (FIG. 18).

The chuck or collets is retained in internal square drive 68 of sprocket 36 of a Chain Drive Tool by hand placement of spring clip 148 into the groove 152.

The spring clip 148 is held in place by spring tension and is kept from rotation by the presence of raised lug interlocks 48.

Object tools held by chuck 134 or collets 156 and are adjustable for working length due to clearance holes 150 provided. Collets 156 provide a set screw 158 or compression nut (not shown) to secure an object tool.

A one-part retaining cap (not Shown) of injection molded flexible material can also be utilized in place of the spring clip 148 shown. This cap would have a clearance hole to allow adjustment of the object tool and would be retained in the same groove 152 as the spring clip 148 by an interference fit with the flexible material.

For low-stress applications, the quick-change toolholders can also be retained by only the snap-spring retaining system.

Industrial Applicability

Because of the wide variety of applications for this inventive system, it is likely to increase productivity significantly by providing faster machining, service and manufacturing operations.

With this system, now more jobs can be accomplished in previously inaccessible areas in a shorter period of time due to the tool-combining lug interlock system, permanently angled tools, compound angle tools, the three position selector switch, secondary tools and the various adaptors and toolholders offered.

Safety and ergonomics are enhanced by access features and the mechanical advantage tools offered by this unique system.

These tools, when die-cast from the proper alloys or injection-molded composite materials, will result in tools with non-sparking, non-magnetic properties suitable for various, safety conscious applications such as explosive environments.

The ability to bring power tool operation to confined areas will also result in products being designed with less wasted space and material usage resulting in further cost savings.

Machinists can now complete operations in less time and in fewer setups using the machine tool applications resulting in cost savings.

While a wide variety of tools and accessories will be offered, customers can buy the exact tools they need with accessories to match their current tooling.

Housings, sprockets, gears, angle housings, lug inserts, square bolt, drives, switch button, switch plate, etc., can be economically mass produced by anyone skilled in the art of injection molding and die casting technology.

This invention has wide utility for auto repair, millwrights, maintenance, manufacturing operations, etc., due to its increased access, speed and versatility over conventional systems.

Like the prior art devices, due to the inherent ability of a chain drive tool to operate rotationally while not having to physically rotate or swing the present tools can be operated in a confined space.

However, the present Chain Drive Tools System offers the additional and advantages as follows:

A. Ability to transfer power around corners with the permanently angled versions unique stress-handling internal track design. FIG. 2A.

B. Ability to transfer power around sharp corners (360 degree rotation from original tool as shown by arrows 180 on FIG. 12) and adjustable for the angle required using the lug interlock system.

C. Ability to transfer power around sharp corners and form compound or right angles as needed using:
　1. The lug interlock system and the compound angle version.
　2. Lug interlock system and right angle version. FIG. 6A.
　3. The lug interlock and the secondary triple tool. FIG. 13.

D. Compound and right angle version provide a novel enclosed, nonbinding, true angle drive which can also be driven at the output end and/or equipped with lug interlock and/or selector switch for added versatility. FIGS. 5A and 6A.

E. Three position selector switch which can be conveniently located near operator end for improved ease of use over prior art. FIG. 1A.

F. Ability to operate independently (like a common ratchet) using the selector switch in the forward and reverse positions. FIG. 11B.

G. Ability to also operate in tandem with power tools, machines, hand tools etc. using the neutral position of selector switch. FIG. 11A.

H. Ability to contain its own power source while still offering operating advantages F and G. FIGS. 1B, 1C, and 1D.

I. Housing can be provided with attachment holes to accommodate:
　1. Attachment to machine tools. FIGS. 15, 16 and 17.
　2. Independent action using an L-shaped rod. FIG. 26A.
　3. Initial positioning and holding of tool in a confined space. FIG. 25.

J. Housings contain their own alignment and assembly features combining lower cost with increased strength. FIG. 2A, FIGS. 8 and 8A.

K. A low-profile tapered version provides increased access by its smaller housing and solid drive sprocket. FIGS. 4 and 4A.

L. With two tools connected on the non-lug sides the tools may be operated in a push-pull fashion for novel operation. FIG. 21.

M. Optional accessories such as drill chucks, collets, square extensions, drive adaptors etc. can be used for increased versatility, convenience and speed. FIGS. 4B, 18 and 28.

N. The output sprocket may be sized internally as requested for specific jobs such as an assembly line operation or manufactured with a standard internal taper. FIG. 8 (104) and FIG. 15 (136).

O. Sprockets and adaptors feature a low-cost, reliable, snap-spring tool holding feature. FIGS. 4A, 4B, 4C and 4D.

P. Low-profile "Shorty" sockets and hex drives are less than one-half the length of conventional drive members offering increased access. FIGS. 20 and 20A.

Q. A multi-purpose combination tool for use as a square driver, screw driver, T-handle, spark plug remover or breaker bar. FIGS. 19 and 19A.

R. Separate right angle (as shown in FIG. 13) and compound angle triple-tools that can be used independently, for machining or for connecting other Chain Drive Tools together with the lug interlock system.

S. The mechanical advantage tools offer increased ergonomics and safety to operators by breaking loose/tightening objects without swinging tool. FIGS. 1E and 1F.

T. Increased ergonomics and safety by the ability to bring the operation of tools out of confined spaces to where it can be accomplished away from obstructions.

U. Chain is pre-stretched, eliminating tensioning items required in prior art.

V. Tools can be economically mass-produced using conventional die-casting or injection-molded technology.

Because of the vast number of sizes, power systems and possible configurations which can be provided by this novel tool system the scope of the invention should be determined not by the embodiments illustrated but by the appended claims and their legal equivalent.

I claim:

1. In a tool having a pair of elongate housings adapted to be joined together in a housing assembly for enclosing and supporting a flexible drive mechanism entrained about a pair of rotatable elements, each being disposed within the housing assembly at opposite ends thereof, the flexible drive mechanism providing a transfer of power between the rotatable elements so that rotation of one rotatable element at an input end of the housing assembly will effect driven rotation of the rotatable element at an output end of the housing assembly, the improvement wherein:

the elongate housings include male and female configurations for aligning and joining the elongate housings without independent fasteners, and said male and female configurations include aligned attachment throughholes for facilitating operation with and attachment to other tools.

2. The improvement of claim 1, wherein the male and female configurations take the form of male bosses provided on one of the elongate housings and mating female tapered holes in the other of the elongate housings, the male bosses being swaged outwardly into engagement with walls of the tapered holes.

3. The improvement of claim 1, wherein the male and female configurations take the form of mating snap fit structure included in each of the elongate housings.

4. The improvement of claim 1, wherein the elongate housings further include a pair of internal configurations, each supporting one of the rotatable elements, the length between the internal configurations defining a precision distance for controlling the working length of the flexible drive mechanism.

5. The improvement of claim 4, wherein the flexible drive mechanism is pre-stretched to eliminate the need for any separate tensioning device in the tool.

6. The improvement of claim 1, wherein the elongate housings are formed in an angular configuration having a higher stress bend area and include a track section which converges towards a centerline of the tool.

7. The improvement of claim 1, wherein the elongate housing takes the form of a tapered configuration tapering from the input end to a smaller dimension at the output end, the rotatable element at the output end being reduced in size relative to the rotatable element at the input end and being provided with a male drive member extending from one side of the housing assembly.

8. The improvement of claim 7, wherein the rotatable element at the output end is formed with an internal configuration located in an end opposite the male drive member for accepting tools with corresponding male configuration.

9. The improvement of claim 1, wherein the rotatable element at the output end includes an internal configuration formed with a throughbore for enabling direct attachment to other objects to be moved.

10. The improvement of claim 1, wherein at least one end of the elongate housings is provided with an adjustable angle interlock configuration providing a means for joining two or more tools with similar design to provide output rotation along a common axis, the interlock configurations joining the tools overlying and encircling aligned rotatable elements having an external or internal configuration for receiving a retaining member for securing the rotatable elements of the tools.

11. The improvement of claim 1, wherein the elongate housings further include internal configurations located near the input end for retaining and supporting a two part switch mechanism comprised of a manually operated, switch button and a switch plate operably connected to the switch button, the switch button having an incorporated, flexible member for moving the switch plate and providing ratcheting action, the switch plate having external configurations for engaging the flexible drive mechanism or one of the rotatable elements, the switch plate also having an internal configuration for engaging and retaining and retaining the incorporated flexible member of he switch button at a desired setting.

12. The improvement of claim 1, wherein the elongate housings are fabricated from a friction reducing material.

13. The improvement of claim 1, wherein the rotatable elements are fabricated from a friction reducing material.

14. The improvement of claim 1, wherein the elongate housings and rotatable elements include a wear reducing coating for extending tool life.

15. The improvement of claim 1 wherein the elongate housings provide structure for enclosing and supporting one of the rotatable elements with a secondary rotary power transfer configuration and a final drive rotatable element, the rotatable element along with the secondary rotary power transfer configuration accepting and transferring rotational power to the final drive rotatable element which, in turn, accepts and transfers rotational force to an object tool at a secondary angle from the elongate housings.

16. The improvement of claim 15, wherein one of the elongate housings includes an end plate having an interlocked configuration providing for angle adjustment and combining of similarly designed tools, and the final drive rotatable element is engageable with a retaining member for securing rotatable components on other tools.

17. The improvement of claim 1, wherein one of the elongate housings includes a power producing mechanism for driving the flexible drive mechanism, and a power switch for controlling the power producing mechanism.

18. The improvement of claim 1, wherein one of the elongate housings includes a structure for providing mechanical advantage to one of the rotatable elements or the flexible drive mechanism, the structure including a manually operated device for producing increased torque thereon by a control switch for controlling direction of torque to one of the rotatable element or the flexible drive mechanism.

19. The improvement of claim 18, wherein the elongate housing includes a gauge operably connected with the mechanical advantage structure for measuring torque.

20. The improvement of claim 1, wherein the elongate housings are formed to attach directly to other tools having drive elements by conventional attachment structure, the rotatable elements being configured to attach directly to the drive elements of the other tools.

21. The improvement of claim 1, wherein the rotatable element on the input end is constructed and arranged to engage a drive of a machine tool, and the rotatable element on the output end is constructed and arranged to receive a conventional tool holding system.

22. The improvement of claim 1, wherein the elongate housings include a light source and a manually operable light switch mechanism operably connected thereto, the light switch mechanism being externally accessible to control the light source.

23. The improvement of claim 1, wherein the elongate housings, the flexible drive mechanism and the rotatable elements are all formed from high strength non-sparking, non-conductive and non-magnetic materials.

24. The improvement of claim 1, wherein the elongate housings, the flexible drive mechanism and the rotatable elements are produced by die casting or injection molding.

\* \* \* \* \*

UNITED STATES PATENT AND TRADEMARK OFFICE
CERTIFICATE OF CORRECTION

PATENT NO. : 6,647,830 B2
DATED : November 18, 2003
INVENTOR(S) : Steven H. Marquardt It is certified that error appears in the above-identified patent and that said Letters Patent is hereby corrected as shown below:

<u>Column 22,</u>
Line 26, cancel the comma ",";
Line 27, cancel the comma ",";
Line 32, cancel the second occurrence of "and retaining";
Line 33, cancel "he" and insert -- the --.

Signed and Sealed this

Twenty-fourth Day of February, 2004

JON W. DUDAS
*Acting Director of the United States Patent and Trademark Office*